United States Patent
Amsden et al.

(10) Patent No.: US 6,224,794 B1
(45) Date of Patent: May 1, 2001

(54) METHODS FOR MICROSPHERE PRODUCTION

(75) Inventors: Brian G. Amsden, Edmonton; Richard T. Liggins, Coquitlam, both of (CA)

(73) Assignee: Angiotech Pharmaceuticals, Inc., Vancouver (CA)

( * ) Notice: Subject to any disclaimer, the term of this patent is extended or adjusted under 35 U.S.C. 154(b) by 0 days.

(21) Appl. No.: 09/305,857

(22) Filed: May 5, 1999

Related U.S. Application Data

(60) Provisional application No. 60/084,508, filed on May 6, 1998.

(51) Int. Cl.[7] .............................. B05D 7/00; B01J 13/02; B01J 13/04; B32B 15/02; B32B 17/02
(52) U.S. Cl. ........................... 264/4.1; 264/4.3; 264/4.33; 264/4.6; 427/213.3; 427/213.31; 427/213.35; 427/213.36; 428/402.2; 428/402.21
(58) Field of Search ........................... 264/4.1, 4.3, 4.33; 264/4.6; 427/213.3, 213.31, 213.35, 213.36; 428/402.2, 402.21

(56) References Cited

U.S. PATENT DOCUMENTS

| | | |
|---|---|---|
| 4,138,383 | 2/1979 | Rembaum et al. . |
| 4,444,961 | 4/1984 | Timm ..................................... 526/88 |
| 4,956,128 | 9/1990 | Hommel et al. .......................... 264/4 |
| 4,981,625 | 1/1991 | Rhim et al. ............................. 264/13 |
| 5,260,002 | 11/1993 | Wang .................................... 264/4.1 |
| 5,376,347 | 12/1994 | Ipponmatsu et al. ................ 423/338 |
| 5,599,889 | 2/1997 | Stöver et al. ......................... 526/217 |
| 5,635,574 | 6/1997 | Aoyagi et al. ........................ 526/212 |
| 5,643,506 | 7/1997 | Rourke .................................. 264/4.1 |
| 5,656,299 | 8/1997 | Kino et al. ............................ 424/489 |

OTHER PUBLICATIONS

Alonso et al., "Biodegradable microspheres as controlled–release tetanus toxoid delivery systems," *Vaccine* 12(4): 299–306, 1994.

Amsden, "The Production of Uniformly Sized Polymer Microspheres," *Pharmaceutical Research* 16(7):1140–1143, 1999.

Amsden and Goosen, "An examination of factors affecting the size, distribution and release characteristics of polymer microbeads made using electrostatics," *Journal of Controlled Release* 43:183–196, 1997.

Bawa et al., "An Explanation for the Controlled Release of Macromolecules from Polymers," *Journal of Controlled Release* 1:259–267, 1985.

Cleland et al., "The Stability of Recombinant Human Growth Hormone in Poly(lactic–co–glycolic acid)(PLGA) Microspheres," *Pharmaceutical Research* 14(4): 420–425, 1997.

Conti et al., "Use of polylactic acid for the preparation of microparticulate drug delivery systems," *J. Microencapsulation* 9(2):153–166, 1992.

Ishikawa et al., "Effect of particle size on phagocytosis of latex particles by guinea–pig polymorphonuclear leucocytes," *J. Biomater. Sci. Polymer Edn.* 2(1): 53–60, 1991.

Jeyanthi et al., "Effect of processing parameters on the properties of peptide–containing PLGA microspheres," *J. Microencapsulation* 14(2): 163–174, 1997.

Kamiyama et al., "Micron–Sized Polymeric Microsphere by Suspension Polymerization," *Journal of Applied Polymer Science* 50: 107–113, 1993.

Kreuter, "Nanoparticles and microparticles for drug and vaccine delivery," *J. Anat.* 189: 503–505, 1996.

Langer and Folkman, "Polymers for the sustained release of proteins and other macromolecules," *Nature* 263; 797–800, 1976.

Leelarasamee et al., "A method for the preparation of polylactic acid microcapsules of controlled particle size and drug loading," *J. Microencapsulation* 5(2): 147–157, 1988.

Maa and Hsu, "Effect of primary emulsions on microspheres size and protein–loading in the double emulsion process," *J. Microencapsulation* 14(2): 225–241, 1997.

Maa and Hsu, "Liquid–liquid emulsification by static mixers for use in microencapsulation," *J. Microencapsulation* 13(4): 419–433, 1996.

Maa and Hsu, "Microencapsulation reactor scale–up by dimensional analysis," *J. Microencapsulation* 13(1): 53–66, 1996.

O'Donnell and McGinity, "Properties of multiphase microspheres of poly(dl–lactic acid) or poly (dl–lactic–co–glycolic acid) produced by mechanical agitation, sonication, or potentiometric dispersion," *J. Microencapsulation* 13(6): 667–677, 1996.

(List continued on next page.)

Primary Examiner—Nathan M. Nutter
(74) Attorney, Agent, or Firm—Seed Intellectual Property Law Group PLLC

(57) ABSTRACT

A process for forming microspheres that includes passing a first composition containing polymer and solvent through an orifice and directly into a second composition containing water and a microsphere-stabilizing agent, under at least one of conditions (a) and (b), wherein (a) the first composition flows through a first conduit along a first path and exits the first conduit at the orifice, the second composition flows through a second conduit along a second path in an upstream to downstream direction, the first conduit is connected to the second conduit and terminates at the orifice, the first and second paths being orientated at an angle θ relative to each other, wherein 0°<θ<180°; (b) the first composition being at a first temperature and including a solvent having a boiling point, the second composition being at a second temperature, the boiling point of the solvent being less than the second temperature; and forming a composition including water and microspheres, the microspheres being formed, at least in part, by the polymer. Such microspheres are suitable for use in the delivery of bioactive agents for animal, aquarian and human use, as a means of radio-imaging tissue, as well as for the controlled release of agro-chemicals.

27 Claims, 10 Drawing Sheets

OTHER PUBLICATIONS

O'Donnell et al., "Properties of multiphase microspheres of poly(D,L–lactic–co–glycolic acid) prepared by a potentiometric dispersion technique," *J. Microencapsulation* 12(2): 155–163, 1995.

Reyderman and Stavchansky, "Novel Methods of Microparticulate Production: Application to Drug Delivery," *Pharmaceutical Development and Technology* 1(3): 223–229, 1996.

Sansdrap and Moës, "Influence of manufacturing parameters on the size characteristics and the release profiles of nifedipine from poly (DL–lactide–co–glycolide) microspheres," *International Journal of Pharmaceutics* 98: 157–164, 1993.

Sato et al., "Porous Biodegradable Microspheres for Controlled Drug Delivery. I. Assessment of Processing Conditions and Solvent Removal Techniques," *Pharmaceutical Research* 5(1):21–30, 1988.

Shiga et al., "Preparation of Poly(D,L–lactide)and Copoly-(lactide–glycolide) Microspheres of Uniform size," *J. Pharm. Pharmacol.* 48: 891–895, 1996.

Siegel et al., "Mechanistic Studies of Macromolecular Drug Release From Macroporous Polymers. I.. Experiments and Preliminary Theory Concerning Completeness Of Drug Release," *Journal Of Controlled Release* 8: 223–236, 1989.

Sosnowski et al., "Synthesis of Bioerodible Poly($\epsilon$–caprolactone) Latexes and Poly(D,L–lactide) Microspheres by Ring–Opening Polymerization," *Journal of Bioactive and Compatible Polymers* 9:345–366,1994.

Uchida et al., "Optimization of Preparative Conditions for Polylactide (PLA) Microspheres Containing Ovalbumin," *Chem. Pharm. Bull.* 43(9): 1569–1573, 1995.

Young et al., "Methods of renal blood flow measurement," *Urol. Res.* 24:149–160, 1996.

METHODS FOR MICROSPHERE PRODUCTION

CROSS-REFERENCE TO RELATED APPLICATIONS

The present application claims the benefit of U.S. Provisional Application No. 60/084,508, filed May 6, 1998.

TECHNICAL FIELD

The present invention relates generally to a process for the preparation of polymeric microspheres. In particular, the present invention relates to a process for preparing microspheres in a manner that provides control over the average particle size, and particle size distribution, of the polymeric microspheres.

BACKGROUND OF THE INVENTION

Polymeric microspheres, i.e., microspheres formed (at least in part) from polymer, have found a variety of uses in the medical and industrial areas. Furthermore, biodegradable polymers have been the subject of numerous studies in controlled drug delivery (Conti et al., *J. Microencapsulation* 9:153 (1992); Cohen and Bernstein, *Microparticulate Systems for the Delivery of Proteins and Vaccines* (Marcel Dekker Inc. 1996)). As drug carriers, microspheres formed from biodegradable polymer(s) have the advantages of providing a large surface area, being easily injected, and not requiring removal after completion of drug release. When used as an injectable drug delivery device, it has been found that drug release rate and microsphere interaction with cells is strongly dependent on the size distribution of the microspheres (Amsden and Goosen, *J. Contr. Rel.* 43:183 (1997); Baker, *Controlled Release of Biologically Active Agents* (John Wiley 1987); Ishikawa. et al., J. Biomater. Sci., Polymer Ed. 2:53 (1991)).

Accordingly, there are numerous publications disclosing studies directed towards developing methods to prepare polymeric microspheres under conditions that allow for controlling the average particle size, and particle size distribution, of the microspheres. These methods include dispersion polymerization of the monomer, potentiometric dispersion of dissolved polymer within an emulsifying solution followed by solvent evaporation, electrostatically controlled extrusion, injection of dissolved polymer into an emulsifying solution through a porous membrane followed by solvent evaporation (see, e.g., Kuriyama et al., *J. Appl. Poly. Sci.* 50:107 (1993); Rembaum et al., U.S. Pat. No. 4,138,383; O'Donnell et al., *J. Microencaps.* 12:155 (1995); Hommel et al., U.S. Pat. No. 4,956,128; Amsden and Goosen, *J. Contr. Rel.* 43:183 (1997); Reyderman and Stavchansky, *Pharm. Dev. Technol.* 1:223 (1996); Ipponmatsu et al., U.S. Pat. No. 5,376,347; Shiga et al., *J. Pharm. Pharmacol.* 48:891 (1996)

Additional methods include vibratory excitation of a laminar jet of monomeric material flowing in a continuous liquid medium containing a suitable suspending agent, irradiation of slowly thawing frozen monomer drops, emulsification and evaporation, emulsification and evaporation using a high shear apparatus and a high hydrophobic phase to hydrophilic phase ratio, controlled polymerization in a solvent, non-solvent mixture, extrusion into a high shear air flow, and continuous injection of dissolved polymer into a flowing non-solvent through a needle oriented in parallel to the direction of flow of the non-solvent (see also, e.g., Timm and Coleman, U.S. Pat. No. 4,444,961; Rhim et al. U.S. Pat. No. 4,981,625; Sansdrap and Moes, *Int. J. Pharm.* 98:157 (1993); Rourke, U.S. Pat. No. 5,643,506; Sosnowski et al., *J. Bioact. Compat. Polym.* 9:345 (1994); Wang, U.S. Pat. No. 5,260,002; Leelarasamee et al., *J. Microencaps.* 5:147 (1988)).

As set forth below, each of these published methods has shortcomings that curtails the utility of the formed-microspheres in various applications, and particularly when the methods are applied to the continuous production of uniformly sized biocompatible, biodegradable, drug-loaded microspheres.

The monomer polymerization processes does not allow the easy inclusion of a bioactive agent within the formed polymeric microsphere (Kuriyama et al., *J. Appl. Poly. Sci.* 50:107 (1993); Rembaum et al., U.S. Pat. No. 4,138,383; Timm and Coleman, U.S. Pat. No. 4,444,961; Rhim et al. U.S. Pat. No. 4,981,625; Sosnowski et al., *J. Bioact. Compat. Polym.* 9:345 (1994)). Furthermore, the polymerization conditions may result in the deactivation of the drug, or the drug may become included in the polymer backbone.

The electrostatic extrusion process does not produce uniformly sized microspheres of a comparatively small diameter (Hommel et al., U.S. Pat. No. 4,956,128; Amsden and Goosen, *J. Contr. Rel.* 43:183 (1997); Reyderman and Stavchansky, *Pharm. Dev. Technol.* 1:223 (1996)).

The emulsification process of Sansdrap and Moes, *Int. J. Pharm.* 98:157 (1993), produces relatively narrow size distributions but is performed in batch mode and in a very small scale (500 milliliters).

Injecting a polymer dissolved in a volatile solvent through a porous membrane produced microspheres of a narrow size distribution but the size of the microspheres is controlled virtually completely by the size of the pores in the glass membrane used, and only low viscosity polymer solutions were possible (Ipponmatsu et al., U.S. Pat. 5,376,347; Shiga et al., *J. Pharm. Pharmacol.* 48:891 (1996)).

The high shear emulsification process of Rourke, U.S. Pat. No. 5,643,506, cannot produce a wide range of microsphere average sizes having a narrow size distribution.

Finally, the injection method of Leelarasamee et al., *J. Microencaps.* 5:147 (1988), involves the use of a non-solvent which requires additional, and difficult removal steps which would decrease the incorporation efficiency of a lipophilic agent, and could not produce narrow microsphere size distributions. Furthermore, Leelarasamee et al. does not demonstrate the ability to control the microsphere average diameter through manipulation of the process parameters.

Thus, a need exists for a simple and reliable method for producing uniformly-sized microspheres. Furthermore, it is desirable to be able to produce uniformly sized microspheres in a continuous fashion in such a manner that the size of the microspheres is easily controllable, that the process is scale-able to large production, and that allows the use of volatile solvents. The present invention provides methods suitable for preparing microspheres. These methods address the problems associated with the existing procedures, offer significant advantages when compared to existing procedures, and in addition, provide other, related advantages.

SUMMARY OF THE INVENTION

Briefly stated, the present invention provides a process for forming microspheres. The process includes passing a first composition containing polymer and solvent through an orifice and directly into a second composition containing water and a microsphere-stabilizing agent, under at least one of conditions (a) and (b), wherein (a) the first composition flows through a first conduit along a first path and exits the first conduit at the orifice, the second composition flows through a second conduit along a second path in an upstream to downstream direction, the first conduit is connected to the second conduit and terminates at the orifice, the first and second paths being orientated at an angle θ relative to each other, wherein 0°<θ<180°; (b) the first composition being at a first temperature and including a solvent having a boiling point, the second composition being at a second temperature, the boiling point of the solvent being less than the second temperature.

This method forms a composition that includes water and microspheres, the microspheres being formed, at least in part, by the polymer. Such microspheres are suitable for use in the delivery of bioactive agents for animal, aquarian and human use, as a means of radio-imaging tissue, as well as for the controlled release of agro-chemicals.

The first conduit may extend into the second conduit to position the orifice within the second conduit, such that the orifice faces 45°≦θ≦90°, where the orifice is facing downstream when θ<90°.

In one aspect, the first fluid composition is injected through a needle and into the second fluid composition, the first composition including a polymer to be formed into a microsphere, the second composition flowing past a tip of the needle. In this way, a composition is formed that includes water and microspheres, the microspheres being formed, at least in part, by the polymer. The second composition flows along a path in an upstream to downstream direction, where the needle and the path of the second composition are orientated at an angle 0 relative to each other. Preferably 45°<θ<90° such that at 90° the needle is perpendicular to the path of the second composition, and at 45° the tip of the needle opens in the downstream direction.

When option (a) is followed, injecting the first composition into the second composition may provide a population of emulsion droplets, the population having an average volume diameter, the average volume diameter having a standard deviation. The average volume diameter and/or standard deviation is typically influenced by the surface tension at the interface of the needle tip and the second composition, by the velocity of the second composition flowing past the needle tip, by the viscosity of the second composition, and/or by the diameter of the needle.

In another aspect, the method includes introducing the first fluid composition into the second fluid composition, the first composition being at a first temperature less than the boiling point of the solvent, the second composition being at a second temperature greater than the boiling point of the solvent, or only slightly less than the boiling point of the solvent, and forming a composition comprising water and microspheres, the microspheres comprising the polymer. According to this aspect, the solvent may be an organic solvent, the second composition may be located within a column having a top and a bottom, the second composition may be stirred at a controlled stirring rate, and/or the first composition may be introduced to the second composition through the bottom of the column at a controlled introduction rate.

In the inventive process, the polymer may be a lipophilic polymer, for example, a lipophilic polymer selected from polyester (e.g., poly(lactide), poly(caprolactone), poly (glycolide), poly(δ-valerolactone), and copolymers containing two or more distinct repeating units found in these named polyesters), poly(ethylene-co-vinylacetate), poly (siloxane), poly(butyrolactone), and poly(urethane). Alternatively, the polymer may be a hydrophilic polymer, for example, a hydrophilic polymer selected from (a) a non-proteinaceous polymer selected from the group consisting of poly(ethylene oxide-co-propylene oxide), carboxylated poly(ethylene) (e.g., CARBOPOL™), poly (phosphazene), and polysaccharide, (b) a poly(amino acid), and (c) a blend of hydrophilic polymers. Other suitable hydrophilic polymers include polymers formed from ethylene oxide and propylene oxide polymers (including homopolymers and copolymers). As used herein, the terms "polymer" and "polymers" include "copolymer" and "copolymers". The polymer may be present in the solvent at a concentration between 5 and 10 w/v %.

In the method, the microsphere-stabilizing agent should be able to stabilize a microspheric form of the polymer. Suitable microsphere-stabilizing agents are known in the art, and include poly(vinyl alcohol), gum arabic, CARBOPOL™, ethylated starches, carboxymethylcellulose, hydroxymethylcellulose, and mixtures thereof. The microsphere-stabilizing agent may be present in the composition at a concentration between 0.1 and 10 w/v % in water, and may preferably be present at a concentration between 1.0 and 2.0 w/v % in water.

In the method, the solvent(s) should be capable of dissolving the polymer. Solvents typically suitable for this role include dichloromethane, carbon tetrachloride, tetrahydrofuran, ethyl acetate. Polyethylene glycol may be a suitable solvent. Solvent mixtures including these listed solvents may also be employed.

In the case of hydrophilic polymers, the second composition would comprise a non-aqueous, water-immiscible solvent and a microsphere-stabilizing agent.

The method provides a population of microspheres, where the population has a volume average diameter and the volume average diameter has a standard deviation. By controlling various parameters of the method, the population of formed microspheres may have a volume average diameter of less than 300 microns, and may have a volume average diameter between 50 and 150 microns. The method can provide a population of microspheres having uniform size, where size uniformity may be characterized by calculating $(\mu+s)/\mu$ for the population, where $\mu$ is the volume average diameter of the microspheres, and s is the standard deviation in the volume average diameter of the microspheres. The method allows the preparation of microsphere populations wherein $1.0 \leq (\mu+s)/\mu \leq 1.3$.

The method may be performed in a continuous manner, such that prior to its contacting the first composition, the second composition does not contain microspheres.

In a further aspect, the invention provides for a population of microspheres, the microspheres prepared by the process of described above. In a preferred aspect, the population is characterized by having $1.0 \leq (\mu+s)/\mu \leq 1.3$. In a preferred aspect, the population is characterized in having a volume average diameter of less than 300 microns. The microsphere population may be dispersed in a fluid medium, e.g., water, or it may be free from fluid medium, i.e., in "neat" form. Freeze drying, e.g., may be used to prepare the neat population. The microspheres may contain a bioactive agent in addition to the polymer.

These and other aspects of the present invention will become evident upon reference to the following detailed description and attached drawings. In addition, various references are identified herein and are incorporated by reference in their entirety.

DETAILED DESCRIPTION OF THE INVENTION

The present invention provides a process for forming microspheres. The process includes passing a first composition containing polymer and solvent through an orifice and directly into a second composition containing water and a microsphere-stabilizing agent, under at least one of conditions (a) and (b), wherein (a) the first composition flows through a first conduit along a first path and exits the first conduit at the orifice, the second composition flows through a second conduit along a second path in an upstream to downstream direction, the first conduit is connected to the second conduit and terminates at the orifice, the first and second paths being orientated at an angle θ relative to each other, wherein $0°<θ<180°$; (b) the first composition being at a first temperature and including a solvent having a boiling point, the second composition being at a second temperature, the boiling point of the solvent being less than the second temperature; and forming a composition including water and microspheres, the microspheres being formed, at least in part, by the polymer.

Figure 1:
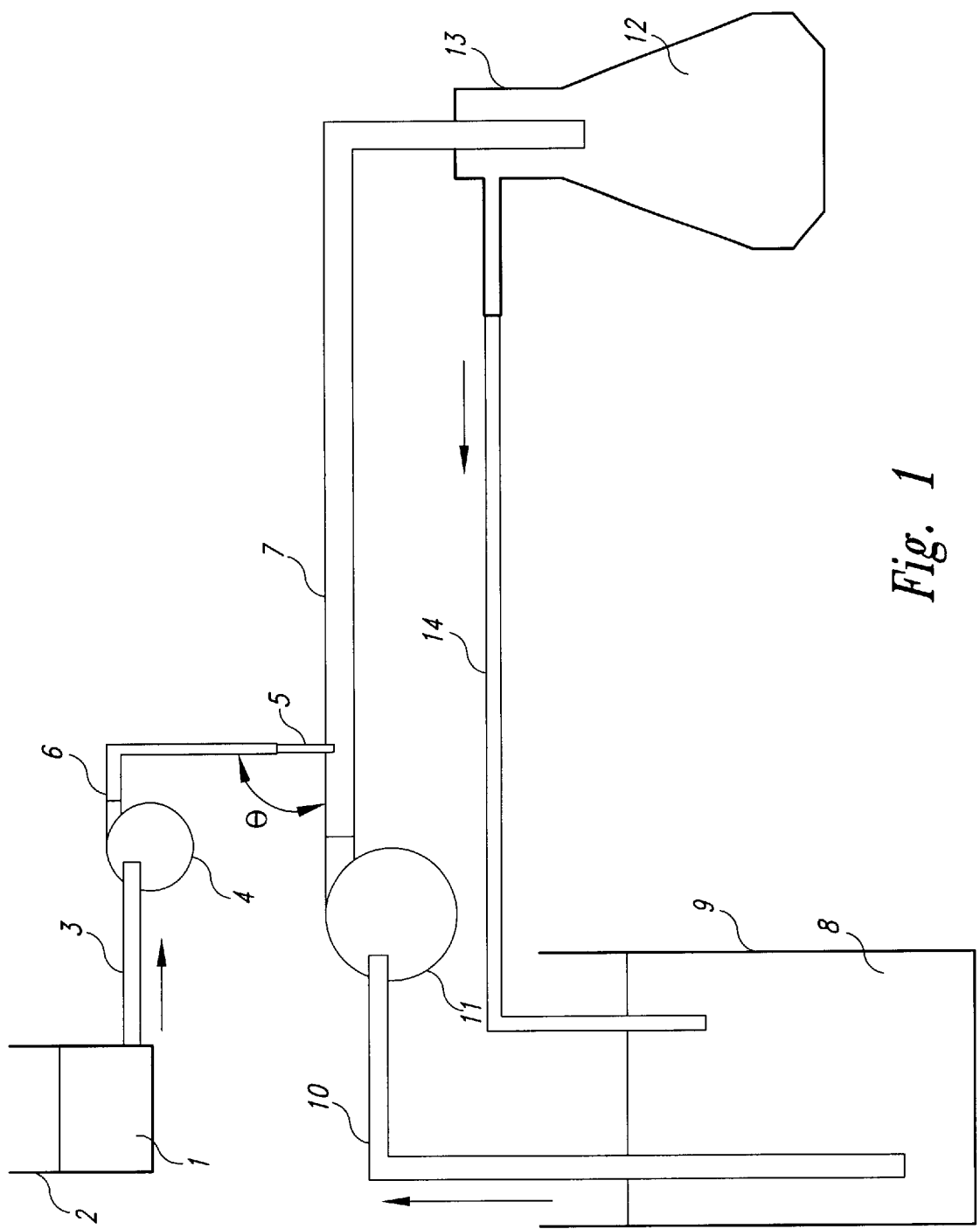
FIG. 1 is a schematic of one method for carrying out the processes described herein.

FIG. 1 provides an illustrative schematic of one aspect of the inventive process. Referring to FIG. 1, a fluid, polymer-containing composition 1 (also referred to herein as the first fluid composition) is held in a reservoir 2. The composition 1 is moved from the reservoir 2 in a controlled manner using, for example, and as shown in FIG. 1, a conduit 3 providing fluid communication between the reservoir 2 and a pump 4. Pump 4, which may be a peristatic pump, is in fluid communication with a needle 5 via conduit 6. The needle 5 is in fluid communication with a conduit 7, where the needle 5 and the conduit 7 intersect at an angle θ. In one alternative, composition 1 may be delivered into conduit 7 using a syringe pump. In either event, composition 1 can be moved into conduit 7 in a controlled manner.

Stabilizing composition 8 (also referred to herein as the second fluid composition) as held in a reservoir 9 is moved through conduit 10 in a controlled manner to and through conduit 7 using, for example, and as shown in FIG. 1, a pump 11. Pump 11 may be, for example, a gear pump. The combination of compositions I and 8 as occurs within conduit 7 provides a microsphere-containing composition 12, which may be collected in a reservoir 13, where reservoir 13 is in fluid communication with conduit 7. Optionally, as shown in FIG. 1, reservoir 13 may be in fluid communication with composition 8 via conduit 14. A pump, for example a peristatic pump, may be placed within conduit 14, to afford further control over the flow of material from reservoir 13 to reservoir 9.

The stabilizing solution consists of a non-solvent for the polymer and optionally a microsphere-stabilizing agent. In some instances, the art may refer to the microsphere-stabilizing agent as an emulsifying agent. Polymer solution droplets (first fluid composition) are drawn off the needle tip in a regular and periodic fashion under the shearing action of the stabilizing solution flow. The size and size distribution of the droplets are controlled by the physical properties of the stabilizing solution, the needle outside diameter, and the surface tension between the polymer solution and/or the needle tip. The droplets formed flow in the stabilizing solution through tubing and are collected in a separate tank. In batch mode operation, the stabilizing solution is recycled back to the feed tank reservoir. This process can be easily converted to produce microspheres in a continuous fashion.

In a preferred embodiment, the solution containing the polymer to be formed into microspheres (i.e., the first fluid composition) is composed of poly(lactide-co-glycolide) (PLGA) dissolved in dichloromethane (DCM). It should be recognized that a number of other polymers can also be used in this process to form microspheres. These polymers include but are not limited to: lipophilic polymers such as polyester (e.g., poly(lactide), poly(caprolactone), poly (glycolide), poly(δ-valerolactone), and copolymers containing two or more of the distinct repeating units found in the listed homopolymers), poly(ethylene-co-vinyl acetate), poly (siloxane), poly(butyrolactone), poly(urethanes), and hydrophilic polymers such as ethylene oxide and/or propylene oxide polymers (e.g., poly(ethylene oxide-co-propylene oxide), carboxylated poly(ethylene) (CARBOPOL™), poly (phosphazenes), polysaccharides such as chitosan, N,O-carboxymethyl chitosan, O-carboxymethyl chitosan, N-carboxymethyl chitosan, alginate, methylcellulose, hydroxymethylcellulose, acacia, tragacanth, as well as gelatin and proteins or polypeptides such as serum albumin and poly(amino acids), and blends, copolymers, and combinations of these polymers.

Suitable solvents for the lipophilic polymers include dichloromethane, carbon tetrachloride, ethyl acetate, and tetrahydrofuran. In some instances, polyalkylene glycol may be a suitable solvent for the lipophilic polymer. Dimethylacetamide is another potentially suitable solvent for the lipophilic polymers. Any aqueous medium is a suitable solvent for the hydrophilic polymers. For a preferred polymer (PLGA) the solvent of choice is dichloromethane.

The stabilizing agents (also referred to as the microsphere-stabilizing agents) which can be used are generally known as protective colloids, and include polyols. These stabilizing agents include poly(vinyl alcohol), gum arabic, CARBOPOL™, ethylated starches, carboxymethylcellulose, hydroxymethylcellulose, and mixtures thereof. Of these, a preferred stabilizing agent is poly(vinyl alcohol).

The needle used in the process can be made from any material which does not dissolve or swell in the fluid compositions. These materials include metals such as brass, steel, stainless steel, and silver, as well as polymers such as high molecular weight poly(ethylene), poly (tetrafluoroethylene) which is commercially available as TEFLON™ from DuPont Company (Wilmington, Del.), poly(carbonate), and poly(propylene), and composites thereof. A way to reduce the diameter of microspheres is to reduce the tension at the polymer solution/needle tip interface. This can be accomplished, for example, by using poly(tetrafluoroethylene) needles, or by using poly (tetrafluoroethylene)-coated needles. Alternatively, needles can be used that have been coated with silicone. A method for producing microspheres having an average diameter less than 70 μm preferably includes the use of needles having a poly(tetrafluoroethylene) or silanized surface.

A plurality of these injection apparati can operate in parallel to increase the production rate and level of microspheres. Moreover, the needle itself can be oriented in any direction, for example, 30° to 120°, preferably from 45° to 90°, with respect to the direction of flow of the stabilizing solution. When the needle is oriented within the range of 45–90°, the population of formed microspheres has a desirably narrow particle size distribution, and a desirably small average particle size.

After the first and second compositions have been combined, and the microspheres have formed, the resulting product is collected in a collection flask or other suitable container. Optionally, if the collected material has excess stabilizing agent, i.e., stabilizing agent that is not needed to stabilize the present concentration of microspheres, then the collected material may be recycled. In being recycled, the collected material effectively serves as "second composition" to which first composition (i.e., composition containing polymer to be formed into microspheres) is added. In this way, the concentration of microspheres may be increased in the collected material, and all or most of the stabilizing agent may be effectively consumed.

When the polymer is lipophilic, the solvent of the first composition will typically not be water soluble to any great extent. Accordingly, when the first composition and second composition are combined, the solvent will predominately be present within the lipophilic microspheres. These microspheres that contain or include a significant amount of solvent, may be referred to herein as "nascent microspheres". When the solvent is more dense than water, for example, when the solvent is dichloromethane, the nascent microspheres will tend to be more dense than water, and will gradually settle to the bottom of the collection flask. In order to collect the nascent microspheres in this instance, it is convenient to allow the microspheres to settle, and then decant away the fluid located above the microspheres, which will comprise primarily water and microsphere-stabilizing agent.

Due to the presence of the solvent, the nascent microspheres tend to be soft, that is, easily deformed by application of pressure. In order to "harden" the microspheres, the solvent(s) should be removed. When the solvent is more volatile than water, which is often the case, removal of the solvent may be accomplished by combining the microspheres, and any fluid surround the microspheres, with a large amount of water. This combination may then be encouraged to evaporate. Since the solvent is more volatile, it will gradually diffuse from the microspheres and into the water, and then evaporate away from the water. This process of evaporation may be encouraged by maintaining the combination of microspheres and large amount of water at elevated temperature. Additional water may be added to the combination as needed. Following this procedure, and after decanting or otherwise separating the microspheres from the water, "hardened" microspheres, having little or no solvent content, may be formed.

According to one aspect of the present invention, a method for producing emulsions is provided in which a lipophilic phase is injected into a flowing hydrophilic phase, through a needle oriented perpendicularly to the direction of flow of the hydrophilic phase. Lipophilic solution droplets are drawn off the needle tip in a regular and periodic fashion under the action of the stabilizing hydrophilic solution flow. The size and size distribution of the droplets is controlled by the physical properties of the stabilizing solution, the needle outside diameter, and the surface tension between the polymer solution and the needle tip. Alternatively, a lipophilic phase can be used as the stabilizing solution for hydrophilic solution droplets. The needle is positioned such that its opening is not in contact with the wall of the conduit containing the stabilizing solution, and preferably extends into the interior of the conduit. Although the preferred embodiment of the invention has the needle oriented perpendicularly to the stabilizing solution flow, the needle can be oriented 45 degrees with respect to the stabilizing solution flow.

In one aspect, the method may be practiced in a continuous manner. This process for continuously producing polymer solution droplets does not have the disadvantages associated with the methods as described in the Background, above. In one aspect, the size of the microspheres is easily controlled by varying the process parameters and produces microspheres of average diameter of less than 300 microns, optionally less than 200 microns, optionally between 50 and 150 microns, and optionally between 70 and 300 microns.

The method can provide a population of microspheres having uniform size, where size uniformity may be characterized by calculating $(\mu+s)/\mu$ for the population, where $\mu$ is the volume average diameter of the microspheres, and s is the standard deviation in the volume average diameter of the microspheres. The method allows the preparation of microsphere populations wherein $1.0 \leq (\mu+s)/\mu \leq 1.3$. The uniformity of particle size may also be expressed in term of the standard deviation of the volume average diameter particle size, where that standard deviation may be maintained between 5 and 15, preferably 8 and 13, more preferably between 8.7 and 12.4, each number being in units of microns.

Figure 2:
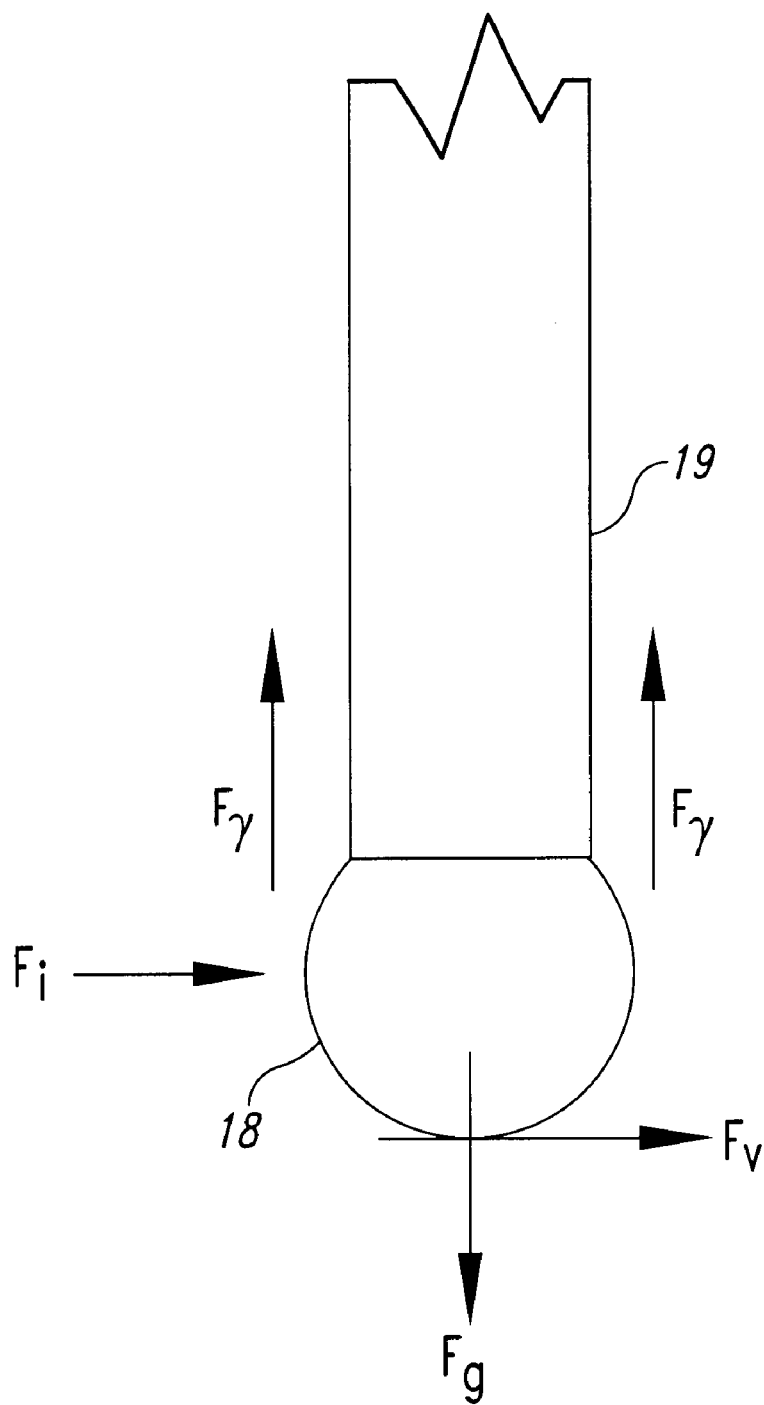
FIG. 2 is a schematic illustrating how various forces act upon a droplet that serves as a precursor to the microspheres.

The process of this invention provides for close control over the mean emulsion size (and hence, the mean microsphere size) as measured by volumetric size distribution. While not meaning to be bound by this theory, it is believed that the mechanism by which this objective is accomplished is as follows. At the needle tip, and as shown in FIG. 2, the forming droplet 18 experiences a number of forces as it leaves the tip of the needle or other conduit 19. There is the force of gravity drawing the droplet downwards, $F_g$, the surface tension at the polymer solution and needle interface, $F_\gamma$, the inertial force of the stabilizing solution contacting the cross-sectional area of the droplet, $F_i$, and the viscous shearing force of the stabilizing fluid on the droplet, $F_v$. These forces can be expressed as follows, $$F_g \, \Delta\rho d^3 \quad (1)$$

$$F_\gamma \, \gamma D \quad (2)$$

$$F_i \, \rho_s v_s^2 d^2 \quad (3)$$

$$F_v \, \mu_s v_s d \quad (4)$$

in which $\Delta\rho$ is the density difference between the two compositions (i.e., the first and second compositions), $\rho_s$ is the density of the second composition, $\Delta$ is the interfacial surface tension, $v_s$ is the velocity of the second composition, and $\mu_s$ is the viscosity of the second composition.

Due to the complexity of the situation, an analytical relationship between these forces would be extremely difficult to derive and would entail numerous, difficult to validate, assumptions. For these reasons, a dimensional analysis method will be applied. Dimensional analysis is a useful engineering tool often used to derive relationships between variables in complex problems (see, e.g., Bird, R. B. et al. *Transport Phenomena* John Wiley and Sons, New York, 1960). The method involves converting the important independent variables of the problem into the minimum number of dimensionless groups. These dimensionless groups are functionally interdependent, and so a correlation between the groups can be obtained by performing experiments in which all the independent variables are varied.

An examination of Equations (1) to (4) reveals the following set of necessary independent variables $\{\Delta\rho, \rho_s, \gamma, \mu_s, D, d, v_s\}$. By using the three fundamental dimensions of time, length, and mass expressed in the subset of variables $\{\rho_s, v_s, d\}$, the following four dimensionless groups were derived, $$\Pi_1 = \frac{d}{D} \quad (5)$$

$$\Pi_2 = \frac{\rho_s v_s d}{\mu_s} \quad (6)$$

$$\Pi_3 = \frac{\gamma}{\rho_s v_s^2 d} \quad (7)$$

$$\Pi_4 = \frac{\Delta\rho}{\rho_s} \quad (8)$$

The densities of the compositions remain essentially constant over the range of concentrations studied and so $\Pi_4$ was removed from consideration. $\Pi_2$ is the ratio of inertial forces to viscous forces and $\Pi_3$ relates the surface tension force to the inertial force. As the groups are all dimensionless and functionally interdependent, the diameter of the forming droplet can be expressed as, $$\frac{d}{D} = f(\Pi_2, \Pi_3) \quad (9)$$

The functional dependence of Equation (9) was determined by varying the variables in each dimensionless group and fitting an expression to the results. The microsphere diameter used in this correlation was that of the final hardened microspheres and not that of the nascent microspheres. It was assumed that the hardening procedure for each group of microspheres prepared was identical. This assumption is reasonable because each group of microspheres was hardened using the same procedure.

Figure 3:
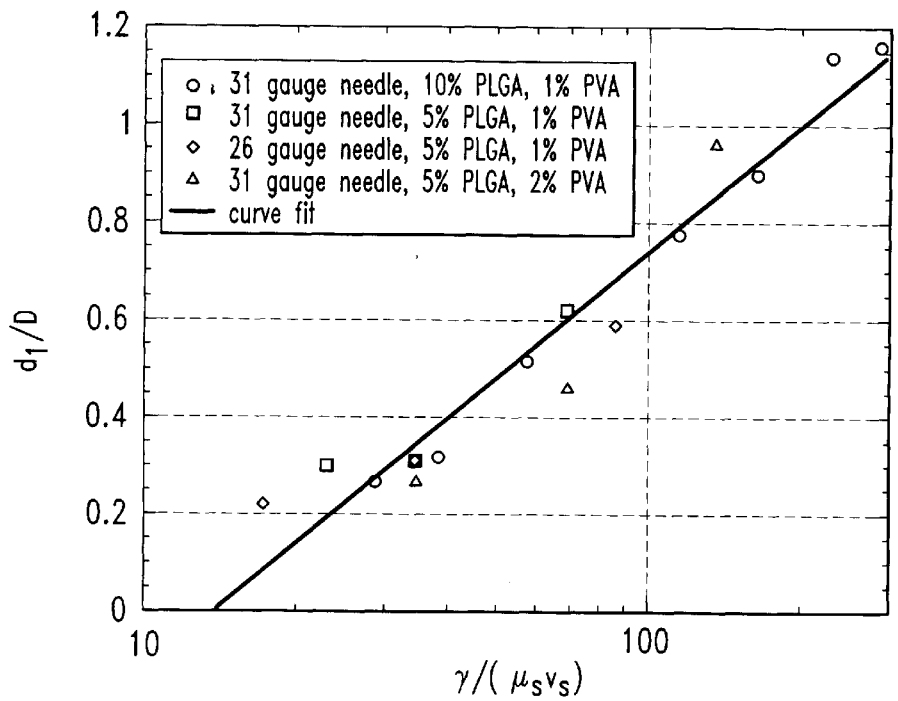
FIG. 3 is a graph illustrating the effect of the process parameters on the standard deviation of the diameter of the microspheres formed

By plotting the mean diameter as a function of the product of the dimensionless groups it was determined that the mean diameter was a logarithmic function of $\Pi_2\Pi_3$ (FIG. 3). Curve fitting the data yielded the following equation (10), $$\frac{d_f}{D} = 0.37 \ln(0.072 \Pi_2\Pi_3) \quad (10)$$

which provided a squared correlation coefficient of 0.96 ($d_f$=diameter of microsphere). Recognizing that the $\Pi_2\Pi_3$ product is simply another dimensionless group, the product was redefined as set forth in equation (11), $$\Pi_5 = \Pi_2\Pi_3 = \frac{\gamma}{\mu_s v_s} \quad (11)$$

This new dimensionless group relates the interfacial tension force to the viscous force at the needle tip. Now equation (11) can be rewritten as equation (12), $$\frac{d_f}{D} = 0.37 \ln\left(0.072 \frac{\gamma}{\mu_s v_s}\right) \quad (12)$$

The finding that the droplet diameter is only a function of $\Pi_5$ indicates that inertial forces do not play a significant role in determining the size of the microspheres formed. The size of the microsphere is determined by a balance between shearing action at the needle tip and the force holding the first composition to the needle. To minimize microsphere mean diameter it is thus necessary to minimize the interfacial tension and/or maximize the stabilizing solution viscosity or the stabilizing solution velocity and/or minimize the outside diameter of the needle used. The logarithmic nature of equation (12) also indicates that there will be a point of negligible return in the manipulation of each of these variables in reducing the mean microsphere diameter.

Figure 4:
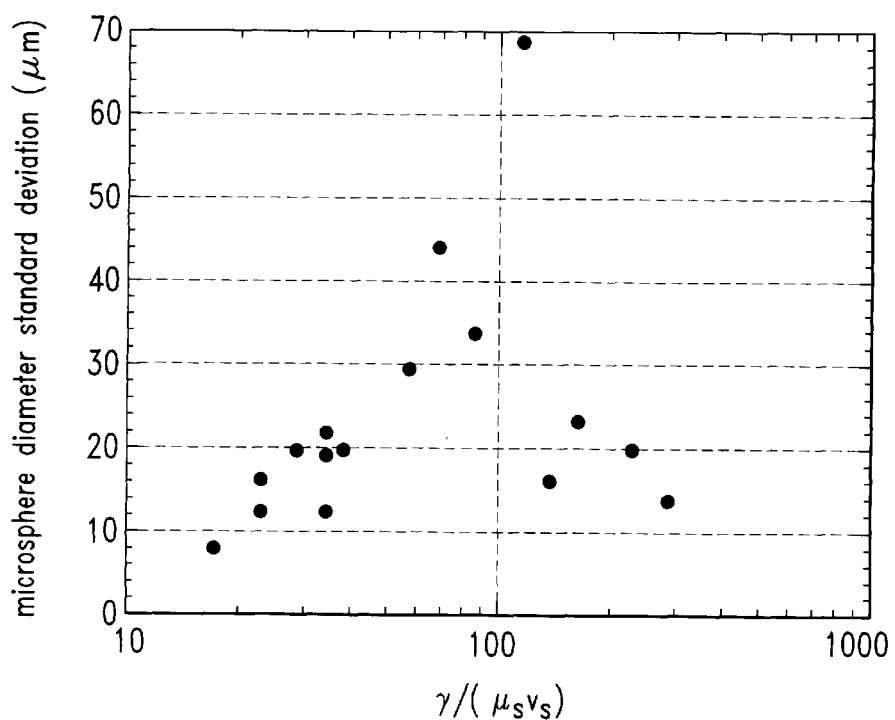
FIG. 4 is a graph illustrating the effect of process parameters on the average diameter of the microspheres formed.

Examination of Table A shows that, under the right conditions, it is possible to obtain narrow size distributions, and that these conditions are also determined by $\Pi_5$. The relationship between $\Pi_5$ and the microsphere population standard deviation is shown in FIG. 4. The Figure demonstrates that small standard deviations (about 25 $\mu$m) and thus narrow size distributions are obtained when $\Pi_5 \geq 150$ and when $\Pi_5 \leq 40$. In other words, narrow distributions arise when either of the significant forces dominate. For $\Pi_5$ less than 40, the viscous shearing forces dominate while for $\Pi_5$ greater than 150 interfacial forces dominate.

The diameter of the microspheres formed using the process is thus a logarithmic function of the stabilizing solution viscosity, $\mu_s$, and velocity, $v_s$, and the interfacial surface tension of the polymer solution and the needle, $\gamma$. The spread of the microsphere diameter distribution is narrow if the value of $\gamma/(\mu_s v_s)$ is greater than 150 or less than 40. The size of the microspheres formed may be minimized by minimizing the outer diameter of the needle and by minimizing the value of $\gamma/(\mu_s v_s)$.

TABLE A

Experimentally determined mean hardened microsphere diameter, $d_f$, standard deviation, s, $\Pi_5$, and operating conditions[a].

| D ($\mu$m) | $\mu_s$ (g/(cm·s)) | $\gamma$ (dyne/cm) | $v_s$ (cm/s) | $d_f$ ($\mu$m)[b] | s | $\Pi_5$ |
|---|---|---|---|---|---|---|
| 254 | 0.015 | 71 | 16.5 | 295 | 13.8 | 286.9 |
| 254 | 0.015 | 71 | 28.8 | 228.2 | 23.3 | 164.4 |
| 254 | 0.015 | 71 | 41.2 | 196.6 | 68.7 | 114.9 |
| 254 | 0.015 | 71 | 82.4 | 130.7 | 29.5 | 57.4 |
| 254 | 0.015 | 71 | 123.5 | 80.7 | 19.8 | 38.3 |
| 254 | 0.015 | 71 | 164.7 | 67.7 | 19.7 | 28.7 |
| 254 | 0.015 | 71 | 20.6 | 290 | 19.9 | 229.8 |
| 254 | 0.015 | 42.6 | 41.2 | 156.4 | 44.1 | 68.9 |
| 254 | 0.015 | 42.6 | 82.4 | 79.9 | 12.4 | 34.5 |
| 254 | 0.015 | 42.6 | 123.5 | 71.1 | 12.4 | 23.0 |
| 457 | 0.025 | 35.5 | 16.5 | 268 | 33.7 | 86.1 |
| 457 | 0.025 | 35.5 | 41.2 | 143.3 | 21.8 | 34.5 |
| 457 | 0.025 | 35.5 | 82.4 | 100.6 | 8 | 17.2 |
| 457 | 0.015 | 42.6 | 41.2 | 244.4 | 16.1 | 68.9 |
| 457 | 0.015 | 42.6 | 82.4 | 120 | 19.1 | 34.5 |
| 457 | 0.015 | 42.6 | 123.5 | 76.2 | 16.2 | 23.0 |

Figure 5:
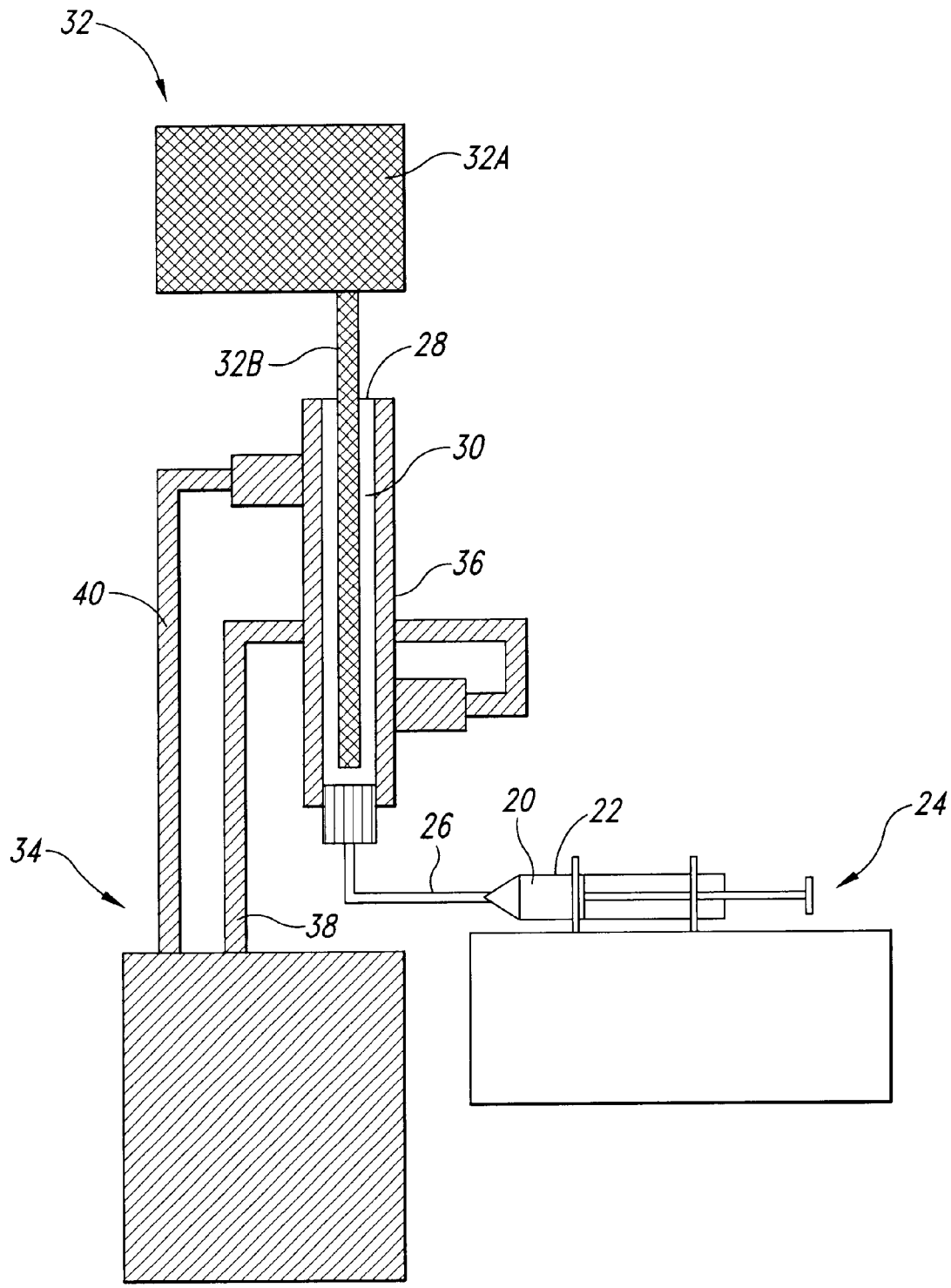
FIG. 5 is a schematic of one method for carrying out the processes described herein.

[a]D is the outside diameter of the needle, $\mu_s$ is the viscosity of the PVA solution, and $\gamma$ is the interfacial tension at the needle-PVA solution interface.
[b]measured from a single lot FIG. 5 provides an illustrative schematic of another aspect of the inventive process. Referring to FIG. 5, a fluid, polymer-containing composition 20 is held in a reservoir 22. The composition 20 is moved from the reservoir 22 in a controlled manner using, for example, and as shown in FIG. 5, a syringe pump 24. Pump 24 is in fluid communication with a conduit 26 through which composition 20 can be delivered into a mixing chamber 28. Mixing chamber 28 is preferably in the shape of a column, as shown in FIG. 5. Mixing chamber 28 is charged with a fluid, composition 30 including a microsphere-stabilizing agent. The contents of mixing chamber 28 are preferably subject to stirring, as provided, for example, and as shown in FIG. 5, by a stirring unit 32. The stirring unit 32 consists of a power source 32A and a stirring rod 32B, where the stirring rod 32B extends into the composition 30.

The mixing chamber 28 is configured in a manner that allows for control of the temperature of the contents of the mixing chamber. Such temperature control may be achieved by, for example, and as shown in FIG. 5, a circulating water bath 34. The temperature of the water within the water bath is controlled by temperature-controlling unit (not shown), and the surface of the mixing chamber 28 is configured to contact the water. The mixing chamber 28 may be configured to contact the water through use of a waterjacket 36 positioned around the mixing chamber 28, and conduits to take the water from the water bath into the water jacket (conduit 38), and from the water jacket back to the water bath (conduit 40), as shown in FIG. 5.

The apparatus shown in FIG. 45 provides a constant temperature to the second composition by way of a circulating water bath to a column of the second composition. The second composition is stirred at a constant rate and the first composition is infused at a constant rate from below, through a syringe. The resulting parameters are thus available for study: nature of the first composition, nature of the second composition, temperature of the system, stirring rate, height of the column of second composition, and rate of infusion of the first composition.

The stirring unit includes a variable power supply which drives a drill motor. A glass rod is attached to the drill motor by a sliding universal joint made of thick rubber tubing to allow the rod both lateral and vertical movement while still providing a constant speed of revolution. This allows the rod to fit easily into the column and not be susceptible to breakage due to vibration of the apparatus. The heating unit includes a water pump with a variable thermostat which allows heating of the water to ±1° C.

The first composition is infused at a controlled rate by means of a syringe pump. The speed of the pump, the size of the syringe and size of the needle are all factors that determine the rate of infusion. The reservoir for the second composition was constructed of a glass "coldfinger" with an outer sleeve for circulating water or other fluid that can effect (control) the temperature of the second composition, and an inner column which contained the second composition. The column is sealed at the bottom with a rubber cork.

The modified solvent evaporation method that may be practiced according to the invention using, for example, the apparatus of FIG. 5, forms microspheres by the evaporation of organic solvent, thereby causing deposition of the polymer dissolved in it. The first composition, once introduced at the bottom of the column holding second composition, forms a droplet. Because the second composition is held at a temperature near or above the boiling point of the solvent present in the first composition, the droplet almost immediately becomes surrounded by a layer of solvent vapor.

As the vapor forms, the droplet becomes lighter than the second (aqueous) composition, causing it to rise. As the vapor rises, it continues to evaporate, causing the vapor layer to grow and the liquid droplet within to shrink until the polymer dissolved becomes supersaturated and begins to precipitate. The precipitation continues as the droplet in the nascent microsphere droplet is removed by evaporation. Once the microsphere reaches the top of the column, the vapor is released and the precipitated polymer (microsphere) becomes suspended in the first composition.

According to this model, several factors are associated with the size of the microsphere, including temperature of the system, stirring, nature of the second composition, and nature of and infusion rate of the first composition.

Temperature limits are placed on the system. At the lower end, the temperature must be near or, preferably, in excess of the boiling point of the solvent present in the first composition, and in any event must be sufficiently high so that the droplets formed develop a vapor layer before they become too large so that the entire droplet can evaporate in the time that it takes to reach the surface of the second composition in the column. At the upper limit the temperature must be lower than the boiling point of the solvent in the second composition, and sufficiently low so that droplets of a significant size may be formed.

At lower temperatures, larger microspheres are formed. The process of droplet formation proceeds as the liquid is infused until the vaporization causes a sufficient change in density so that it floats away. At lower temperatures the vaporization process occurs more slowly and the droplet is infused longer and is therefore larger, producing larger microspheres. As well, if the process of evaporation is very slow, the constant infusion of new cooler first composition will further slow the process.

As the temperature is increased the average droplet size is decreased. Thus the size distribution shifts towards the smaller sizes. All temperatures studied follow this trend with the exception of lowest temperature. This suggests that at the higher end of the temperature range, the temperature's effect on the droplet size as a result of the rate of vaporization is more important than at the lower end. At the lower end of the temperature range other factors may dominate the mechanism of microsphere formation.

Studying a temperature range produced a trend in the size distribution, whereas the other parameters, such as the stirring rate, when changed produced very drastic results, i.e., failure or success in producing microspheres.

Stirring the system was found to be necessary for the production of microspheres. Stirring serves to carry the droplet away from the site of infusion, and creates a current that moves perpendicular to the rising microspheres. This lateral flow slows the rise of the microspheres as they travel in a spiral upwards, and keeps the bubbles moving steadily along a path so that they may not contact each other and coacervate, as well as the current provides a shear force which tends to break up very large bubbles.

The nature of the second composition is important in stabilizing the droplets. Of the three microsphere-stabilization agents examined, TWEEN™ 80 and PVA 2% and 4% (that is, poly(vinyl alcohol at 2 wt % and 4 wt % in water), the PVA systems were much more effective. Further, the PVA 4% system produced the greatest yield of microspheres.

Each of these agents is involved in stabilizing the droplets as they form and rise through the column of second composition. However, the largest difference in each of the systems is likely the effect of their viscosities. A higher viscosity is necessary to slow the rise of the droplets so that they may fully evaporate. TWEEN™ 80 yielded the least viscous system and only very small microspheres could form as only very small droplets had time to evaporate before reaching the surface. The more viscous PVA systems slowed the rising droplets more and thus produced larger microspheres. The most viscous system (PVA 4%) produced the highest yield of microspheres, with no formation of irregular aggregates.

No microspheres were produced using diethyl ether as the solvent in the first composition, while high yields were attained with dichloromethane (also known as methylene chloride). This drastic difference is likely due to differences in the rate of evaporation, and the interaction of the dissolved polymer with each solvent. An optimum volatility is required such that it is low enough that large enough droplets may form, and high enough that the droplets evaporate quickly. Diethyl ether boils at 34.4° C. and dichloromethane boils at 39.8° C.

The hydrophobicity of the solvent is also likely to be an important factor in microsphere formation. The solvent hydrophobicity will affect the salvation of the polymer, and the saturation concentration at which precipitation within the rising droplet begins. With a lower threshold for supersaturation, precipitation of polymer would occur into a larger volume of liquid, and would be slower process. With a higher threshold of supersaturation, precipitation would occur more quickly and the deposition of the polymer would be governed more by the shape of the droplet as less organic liquid would be present. The concentration of the polymer in solution also affects the process of precipitation. At higher concentrations, more polymer is available per droplet, and likely, the saturation concentration is achieved much earlier. As well, at higher concentrations, smaller droplets of organic phase provide the amount of polymer necessary to form larger microspheres. However, concentrations of EVA of 5 and 10% both produced microspheres.

If a target size range for microspheres is established the efficiency at each temperature can be evaluated. Table B shows the efficiency at each temperature in producing microspheres between the range of 50–150μ. Because the microspheres smaller than the target size are more than two orders of magnitude smaller than those larger than the target range, the presence of smaller microspheres is less significant than the presence of large ones, on a volume percent basis. Thus, in the temperature range which exhibits the trend, the temperatures producing smaller on average sizes shows the greatest percentage of microspheres in the appropriate size range.

TABLE B

Percent Volume of Total Sample in Target Size Range (50–150μ) at all Temperatures

| Temperature | Efficiency |
|---|---|
| 51° C. | 57.0% |
| 55° C. | 27.1% |
| 59° C. | 14.4% |
| 63° C. | 10.4% |
| 67° C. | 63.8% |
| 72° C. | 52.3% |

1. Applications of Microspheres

The microspheres described herein can be used as size standards for analytical purposes. Such a use of microspheres or microparticles is well-known to those of skill in the art.

The microsphere-forming process described herein can be used in any application in which uniformly sized particles are desired. It can be used to form emulsions useful in preparing microcapsules by any known process, where microcapsules are essentially hollow microspheres. It can also be used to form emulsions useful in preparing microspheres by any known process.

In a preferred embodiment of the invention, the microspheres are composed of biodegradable, biocompatible polymers and contain a bioactive agent dispersed therein. The bioactive agent may be dissolved within the polymer phase or dispersed as discrete solid particles.

Microspheres of the present invention can also be used for embolization. For example, microsphere-induced embolization has been used to treat vascular disease (see, for example, Beaujeux et al., *Am. J. Neuroradiol.* 17:541 (1996)). Moreover, microspheres have been used for preoperative embolization of hemangioblastomas (see, for example, Eskridge et al., *Am. J. Neuroradiol.* 17:525 (1996)).

The present invention also contemplates the use of microspheres to measure the rate of blood flow. As an illustration, Young et al., *Urol. Res.* 24:149 (1996), used a microsphere technique for visual assessment of renal blood flow.

Uniformly sized microspheres can also be used to deliver a bioactive agent to a subject in need of treatment. Such therapeutic microspheres can be produced either by incorporating a bioactive drug within the microspheres, or by binding a bioactive drug to the surfaces of microspheres. Examples of suitable bioactive agents include anti-proliferative agents, steroids, analgesics, narcotic antagonists, antibiotics, anti-fungals, anti-histamines, anti-asthmatics, β-blockers, and anti-cancer agents. In addition, radioactively-labeled microspheres can be used for therapeutic purposes. As an illustration, 90-yttrium has been used to treat hepatic tumors (see, for example, Leung et al., *Int. J. Radiat. Oncol. Biol. Phys.* 33:919 (1995), and Ho et al., *Eur. J Nucl. Med.* 24:293 (1997)).

A suitable bioactive agent for incorporation within a microsphere should have a solubility parameter close to that of the polymer used to make the microsphere. In this way, the same solvent can be used to dissolve the bioactive agent and the polymer to produce a homogeneous solution.

Such a preference for solubility does not apply, however, to therapeutic microspheres comprising a bioactive agent bound the surface. For example, polypeptides, such as pharmacologically active peptides, antigens, and antibodies, are suitable for binding to microsphere surfaces. As an illustration, microspheres can be produced that bear an infectious agent antigen for vaccination.

Microspheres can also be produced that comprise bioactive agents incorporated within the microsphere and bound to the surface. For example, antibodies or antibody fragments can be bound to a microsphere surface to target delivery of another bioactive agent contained within the microsphere.

In addition, microspheres can be incorporated into a second polymer. That is, uniformly sized microspheres can be dispersed throughout a gel or a viscous solution, or dispersed throughout a solid, biodegradable polymer scaffold.

Therapeutic microspheres can be delivered to a subject via transdermal, oral, nasal, pulmonary, ocular, or parenteral routes. Examples of parenteral routes include intramuscular, intra-tumoral, intra-arterial, and intravenous administration. Since therapeutic microspheres can be used for both human therapy and veterinary purposes, suitable subjects include both humans and non-human animals.

Microspheres comprising a bioactive agent can also be used in a variety of agricultural applications.

Controlled release systems for the release of macromolecules from a polymer matrix have been proven effective for many applications. Since 1971, poly(ethylene vinylacetate), (EVA) has been studied for this use, and EVA may be used as the polymer in the first compositions according to the processes described above. EVA is a hydrophobic, non-degradable polymer which has proven biocompatibility. It has been used in delivery systems for various macromolecules such as herapin, enzymes, and antigens. The mechanism of controlled release of macromolecules from non-degradable polymers has been shown to involve aqueous diffusion of the macromolecule through a network of interconnecting channels that arise within the polymer at the time of incorporation of the macromolecule.

Recent work has demonstrated the controlled release of angiogenic and angiostatic proteins from an EVA matrix. The release of angiostatic proteins might find application in treating certain forms of cancer. The treatment would proceed by delivering angiostatic proteins to a tumor site thus inhibiting the circulation of blood to the tumor. The delivery of this drug, through the blood stream to such a location is well suited to employing microspheres as the drug carrier. Microspheres appear themselves to significantly block blood flow in capillary beds, and microspheres containing chemotherapeutic drugs have been used in treating developed tumors.

The present invention, thus generally described, will be understood more readily by reference to the following examples, which are provided by way of illustration and are not intended to be limiting of the present invention.

EXAMPLES

The following run procedure was performed for each of Examples 1–4 below. To start the run, a poly(vinyl alcohol) (PVA) solution was pumped through the flow circuit until all entrained air bubbles were removed. At this point, the peristaltic pump was turned on and the PLGA solution pumped into the PVA solution. The apparatus was allowed to run for 5 minutes, at which point the PLGA feed pump was reversed to stop all PLGA flow instantly. The PVA solution flow was then stopped and the PLGA in DCM (dichloromethane) emulsion was collected by decanting all but 100 ml of the PVA solution from the collection flask. The emulsion was then poured into 500 ml of fresh reverse osmosis water and stirred at 150 rpm using a 2 inch diameter paddle stirrer in a fume hood for 16 hours to allow for DCM removal. The hardened PLGA microspheres were collected and sized by placing a sample on a slide and measured using a calibrated micrometer on a microscope (100 times magnification). To obtain the population distribution, over 300 microspheres were measured. The volume average diameter and standard deviation of the population was then determined in the usual fashion. In the evaluation of the effects of the process parameters, the tension at the needle-PLGA solution interface and the viscosity of the PVA solution needed to be determined. The interfacial tension between the needle and the PLGA solution was calculated by first measuring the diameter of a droplet forming in the needle tip in a stagnant PVA solution contained in a graduated cylinder using an image analysis system. The diameter of the droplet just prior to it detaching from the needle was measured and the interfacial tension calculated using equation (13), $$\gamma = \frac{\pi d^3}{6D} \Delta \rho g \tag{13}$$

The viscosity of the PVA solution was obtained using a Cannon-Fenske capillary viscometer. The reflux time through the capillary was measured in triplicate. The viscosity was then calculated by correlation of these reflux times to that of reverse osmosis water.

According to the procedure employed in Examples 1–4, size uniformity is measured by standard geometric deviation which incorporates the population standard deviation. The standard geometric deviation is calculated using the formula: $(\mu+s)/\mu$, where $\mu$ is the number average diameter, and s is the sample standard deviation. The closer the value for the standard geometric deviation is to one, the more uniform the size of the microsphere population. As an illustration, the standard geometric deviations for the microsphere populations of Examples 1–4 are: 1.05 for the population of Example 1, 1.08 for the population of Example 2, 1.17 for the population of Example 3, and 1.18 and 1.25 for the populations of Example 4.

In sum, the process described herein can produce microspheres of narrow diameter distribution in a continuous manner. Furthermore, the process is readily scaleable to produce large quantities of microspheres in a continuous manner. Additionally, the process can be manipulated easily to produce a wide range of uniformly sized microspheres. These capabilities of the new process will be demonstrated in the examples below.

Example 1

Production of Microspheres having an Average Diameter of About 295 $\mu$M

According to the run procedure set forth above, a 10 w/v % PLGA (85:15 lactide:glycolide, weight average molecular weight 88,000, Birmingham Polymers Inc.) in DCM solution was pumped at 2 ml/min. through a 31 gauge stainless steel, blunt-end needle (Chromatographic Specialties Inc.). The needle was seated at a 90 degree angle within TEFLON™-coated polyethylene tubing (internal diameter 0.25 inches), protruding through the tubing wall with the end of the needle approximately 1 mm from the tube wall. A 1 w/v % PVA in reverse osmosis water solution was pumped at a constant rate of 16.5 cm/s through the polyethylene tubing and past the needle. The interfacial tension was 71 dyne/cm and the viscosity of the PVA solution was 0.015 g/(cm s). The volume average diameter of the microspheres formed was 295 $\mu$m with a standard deviation of 13.8 $\mu$m.

Example 2

Production of Microspheres Having an Average Diameter of About 100 $\mu$M

Using the procedure described in Example 1, a 5 w/v % PLGA (85:15 lactide:glycolide, weight average molecular weight 88,000, Birmingham Polymers Inc.) in DCM solution was pumped at 2 ml/min. through a 26 gauge stainless steel, blunt-end needle (Chromatographic Specialties Inc.). The needle was seated at a 90 degree angle within TEFLON™-coated polyethylene tubing (internal diameter 0.25 inches), protruding through the tubing wall with the end of the needle approximately 1 mm from the tube wall. A 2 w/v % PVA in reverse osmosis water solution was pumped at a constant rate of 82.4 cm/s through the polyethylene tubing and past the needle. The interfacial tension was 35.5 dyne/cm and the viscosity of the PVA solution was 0.025 g/(cm s). The volume average diameter of the microspheres formed was 100.6 $\mu$m with a standard deviation of 8.0 $\mu$m.

Example 3

Production of Microspheres Having an Average Diameter of About 71 $\mu$M

Using the procedure outline in Example 1, a 5 w/v % PLGA (85:15 lactide:glycolide, weight average molecular weight 88,000, Birmingham Polymers Inc.) in DCM solution was pumped at 2 ml/min. through a 31 gauge stainless steel, blunt-end needle (Chromatographic Specialties Inc.). The needle was seated at a 90 degree angle within TEFLON™-coated polyethylene tubing (internal diameter 0.25 inches), protruding through the tubing wall with the end of the needle approximately 1 mm from the tube wall. A 1 w/v % PVA in reverse osmosis water solution was pumped at a constant rate of 82.4 cm/s through the polyethylene tubing and past the needle. The interfacial tension was 42.6 dyne/cm and the viscosity of the PVA solution was 0.015 g/(cm s). The volume average diameter of the microspheres formed was 71.1 μm with a standard deviation of 12.4 μm.

Example 4

Production of Microspheres Having an Average Diameter of About 80 μM

The procedure outlined in Example 1 was used, with the exception that the needle was oriented 45° with respect to the direction of flow of the PVA solution (FIG. 1 where θ=45). A 5 w/v % PLGA (85:15 lactide:glycolide, weight average molecular weight 88,000, Birmingham Polymers Inc.) in DCM solution was pumped at 2 ml/min. through a 31 gauge stainless steel, blunt-end needle (Chromatographic Specialties Inc.). A 1 w/v % PVA in reverse osmosis water solution was pumped at a constant rate of 123.5 cm/s through the polyethylene tubing and past the needle. The interfacial tension was 71 dyne/cm and the viscosity of the PVA solution was 0.015 g/(cm s).

The volume average diameter of the microspheres formed was 80.6 μm with a standard deviation of 14.8 μm. Using the same conditions, but with the needle oriented at a 90° angle with respect to the direction of flow of the stabilizing fluid, produced a volume average microsphere diameter of 80.7 μm with a standard distribution of 19.8 μm.

Example 5

Production of Microspheres using Apparatus of FIG. 5

Materials. Poly(ethylene-co-vinylacetate) was obtained from Dupont (Wilmington, Del.) in the form of ELVAX™ 40, indicating 40% by weight vinylacetate units. The solvents employed were diethyl ether, Analar Grade (BDH Chemicals, Toronto, Ontario, Canada, http://www.bdh.com) and dichloromethane (BDH Chemicals). The dispersing agents employed in the aqueous phase were TWEEN™ 80 and polyvinyl alcohol (PVA).

Preparation of microspheres: An apparatus was constructed as shown in FIG. 5. Using this apparatus, the first compositions studied were EVA 5% w/w or 10% w/w in either diethyl ether, or dichloromethane. The second compositions studied were TWEEN™ 80 0.5% w/w and PVA 2% w/w or 4% w/w. The first compositions were infused allowing each bubble formed to evaporate producing a microsphere. Six to eight mL of second composition were placed in the column. Approximately 0.5 to 1 mL of first composition was infused. After infusion, the combination of first and second compositions was collected.

Characterization of EVA microspheres: The microspheres were stored in the aqueous phase. Following resuspension of the microspheres by shaking, a drop of the suspension was viewed microscopically and microspheres were counted to obtain a size distribution. A magnification power of 140× was used and for each count a field of 1 mm was viewed. Sizes were measured against a micrometer scale placed in the filed. Not less than three different fields were counted per sample. The shape and surface properties of the products were observed when possible and irregularities were noted. Scanning electron microscopy of several microspheres was conducted. The microspheres were rinsed with distilled water and placed on a carbon base and coated with a platinum-gold alloy.

Results

The first series of experiments involved developing the methodology for the preparation of microspheres and the results are therefore expressed qualitatively (Tables 1 and 2). All trials in Table 1 used TWEEN™ 80 to stabilize the aqueous phase and those in Table 2 use PVA.

TABLE 1

QUALITATIVE ANALYSIS OF SYSTEM WITH TWEEN ™ 80 FOR THE SYNTHESIS OF EVA MICROSPHERES

| Aqueous Phase | Organic Phase | EVA conc. | Temp. | Stirring Rate | Infusion Rate | Observations: |
|---|---|---|---|---|---|---|
| Water | Ether | ~10% | 62° | None | Slow | EVA aggregates on the surface as a sticky rubber |
| Tween 80 0.5% | Ether | 2% | 62° | Fast | Slow | Very small, irregularly shaped aggregates, 1μ |
| Tween 80 0.%  | Ether | 5% | 62° | Fast | Slow | Samll irregularly spaced aggregates 1–20μ |
| Tween 80 0.5% | Ether | 10% | 62° | Fast | Slow | Very small, irregularly shaped aggregates, 1μ |
| Tween 80 0.5% | Ether | 7% | 62° | Fast | Slow | Very small, irregularly shaped aggregates, 2μ |
| Tween 80 0.5% | Ether | 5% | 55° | Medium | Slow | Very small, irregularly shaped aggregates, 1 and 20μ |
| Tween 80 0.5% | Ether | 5% | 55° | Fast | Slow | Small, irregularly aggregates, 1–5μ |
| Tween 80 0.5% | Ether | 5% | 55° | Very Fast | Slow | Small, irregularly aggregates, 1–5μ |
| Tween 80 0.5% | Ether | 5% | 55° | None | Slow | EVA aggregates on the surface as a sticky rubber |
| Tween 80 0.5% | Ether | 5% | 62° | Fast | Fast | Many small aggregates with some larger irregular aggregates, 1–20μ |
| Tween 80 0.5% | MeCl$_2$ | 5% | 52° | None | Fast | Org. phase doesn't boil of instantly, wide range of aggregates 1–50μ, some fibers 5 × 100μ, some aggregation on surface of water |
| Tween 80 0.5% | MeCl$_2$ | 5% | 52° | Fast | Medium | Small irregular aggregates 2–35μ, no fibers, some aggregation |

TABLE 1-continued

QUALITATIVE ANALYSIS OF SYSTEM WITH TWEEN ™ 80
FOR THE SYNTHESIS OF EVA MICROSPHERES

| Aqueous Phase | Organic Phase | EVA conc. | Temp. | Stirring Rate | Infusion Rate | Observations: |
|---|---|---|---|---|---|---|
| Tween 80 0.5% | MeCl$_2$ | 5% | 100° | None | All at once | Org. phase boils off vigorously, many small aggregates, 1–10μ, some larger 80–100μ, several fibers, 5 × 100–400μ |
| Tween 80 0.5% | MeCl$_2$ | 5% | 52° | Slow | Slow | Many small aggregates, <1μ, many fibers, 5 × 100–400μ, some larger aggregates, 80–100μ |
| Tween 80 0.5% | MeCl$_2$ | 5% | 42° | Slow | Slow | Many small aggregates, <1μ, many fibers, 5 × 100–400μ, very few larger aggregates, 60–100μ |
| Tween 80 0.5% | MeCl$_2$ | 5% | 32° | Slow | Fast | Org. phase did not boil, no observations |
| Tween 80 0.5% | MeCl$_2$ | 5% | 72° | Medium | Fast | Lots of aggregation on the surface, small aggregates, 5–50μ, a few short fibers, very few microspheres, 20–50μ |
| Tween 80 0.5% | MeCl$_2$ | 5% | 62° | Medium | Fast | Lots of aggregation on the surface, very few small aggregates, 1–5μ |
| Tween 80 0.5% | MeCl$_2$ | 5% | 62° | Medium | Slow | Many small aggregates, 1–5μ, some microspheres, 1–10μ |
| Tween 80 0.5% | MeCl$_2$ | 10% | 62° | Medium | Slow | Many small irregular aggregates, 1–25μ, some microspheres, 1–15μ |
| Tween 80 0.5% | MeCl$_2$ | 10% | 62° | Medium | Fast | Some aggregation on the surface, some irregular aggregates, 5 . 50μ, few microspheres, 5–10μ |

TABLE 2

QUALITATIVE ANALYSIS OF SYSTEM WITH PVA
FOR THE SYNTHESIS OF EVA MICROSPHERES

| Aqueous Phase | Organic Phase | EVA conc. | Temp. | Stirring Rate | Infusion Rate | Observations: |
|---|---|---|---|---|---|---|
| PVA 4% | MeCl$_2$ | 10% | 62° | Fast | Medium | Microspheres 1–350μ |
| PVA 4% | MeCl$_2$ | 5% | 72° | Fast | Medium | Few Microspheres 10–50μ, and many small aggregates <1μ |
| PVA 4% | MeCl$_2$ | 10% | 62° | Fast | Slow† | Microspheres 1–75μ with some irregular aggregates |
| PVA 4% | MeCl$_2$ | 10% | 62° | Fast | Slow | Microspheres 1–40μ plus some large ones |

Example 6

Production of Microspheres Using Apparatus of FIG. 5: Effect of Temperature on Microsphere Formation Following the procedure set forth in Example 5, six runs were performed at temperatures ranging from 51 to 72° C. In each of the six runs, the first composition (the organic phase) contained dichloromethane as the solvent and a 10% concentration of ELVAX™ 40. The second composition (the aqueous phase) contained water and a 2% concentration of poly(vinyl alcohol). The stirring rate was fast, and the infusion rate was 0.195 ml/sec.

Each of the six runs produced almost exclusively microspheres having few surface irregularities. Some runs resulted in aggregation of EVA, but this was not specifically monitored and assessed.

Figure 6A:
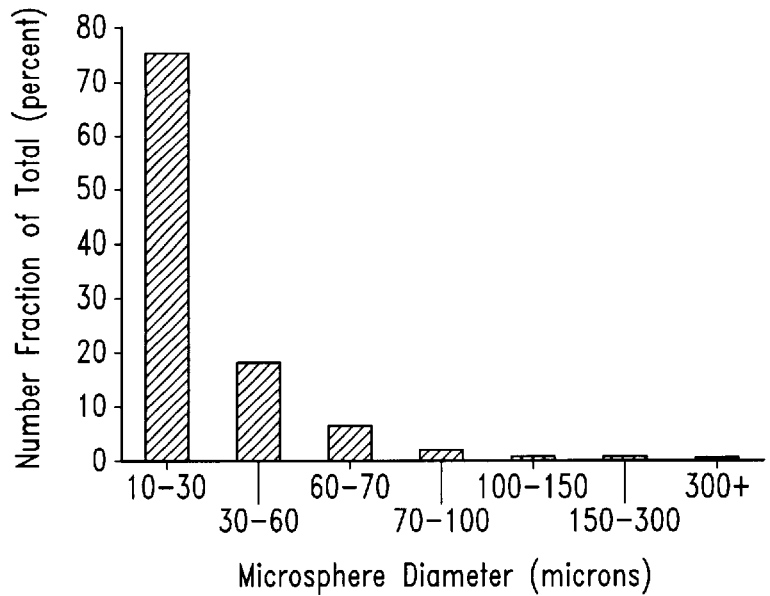
FIGS. 6A, 6B, 7A, 7B, 8A, 8B, 9A, 9B, 10A, 10B, 11A, and 11B are graphs illustrating the effect of temperature on microsphere size and microsphere size distribution for microspheres prepared using the apparatus of FIG. 5.
Figure 6B:
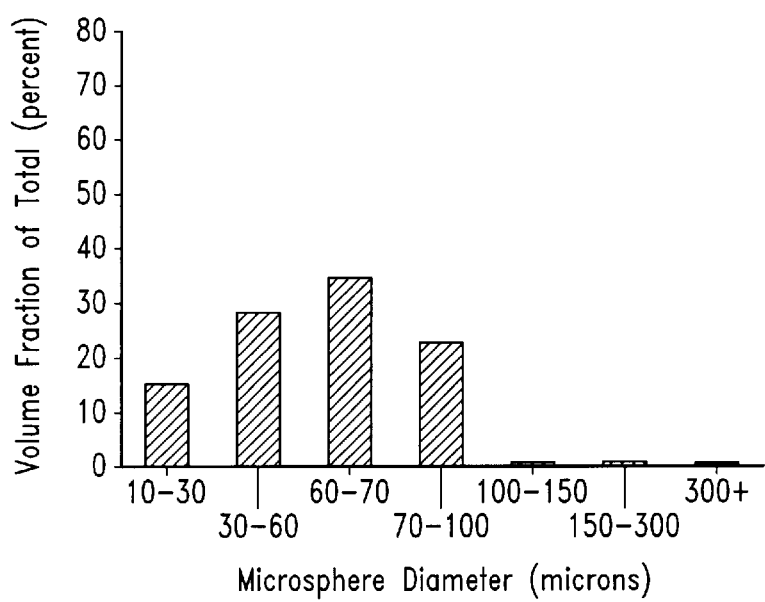

FIGS. 6A and 6B provide bar graphs of Number Fraction of Total (percent) vs. microsphere diameter (microns) and Volume Fraction of Total (percent) vs. microsphere diameter (microns), respectively, for a run conducted at 51° C., and with measurements performed on a sample size of 474.

Figure 7A:
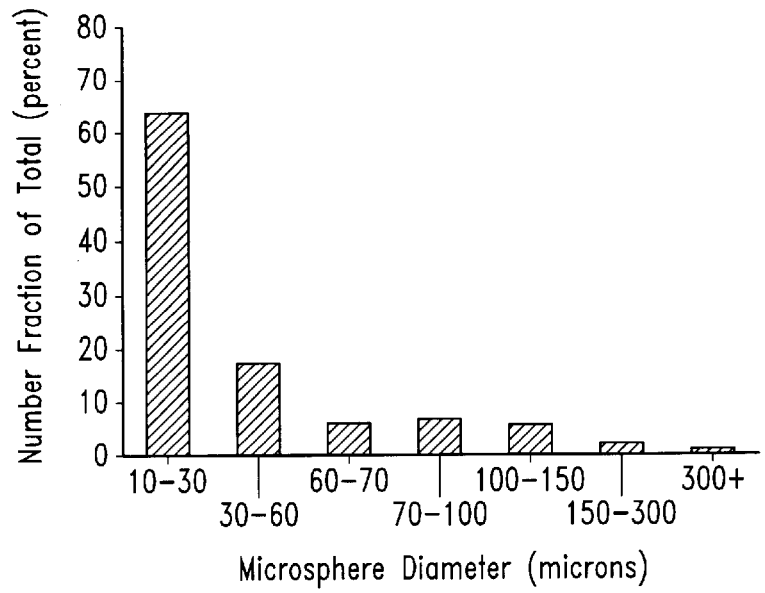
Figure 7B:
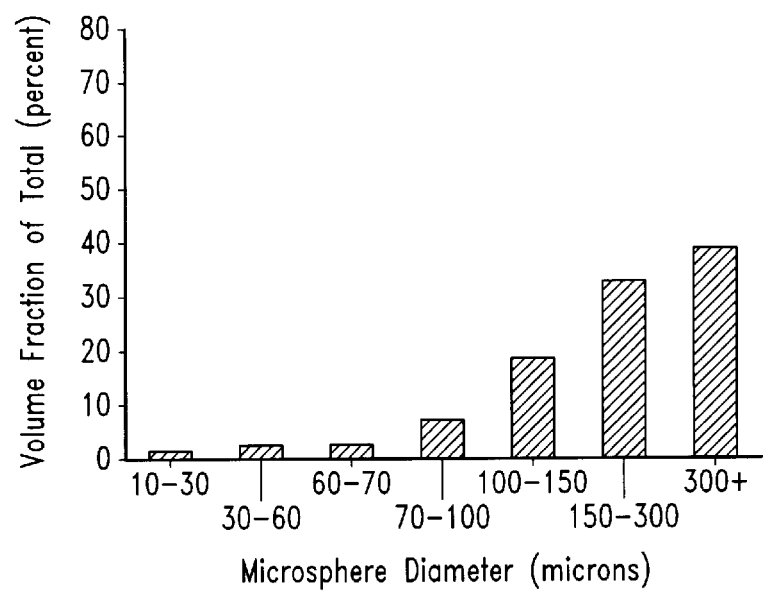

FIGS. 7A and 7B provide bar graphs of Number Fraction of Total (percent) vs. microsphere diameter (microns) and Volume Fraction of Total (percent) vs. microsphere diameter (microns), respectively, for a run conducted at 55° C., and with measurements performed on a sample size of 366.

Figure 8A:
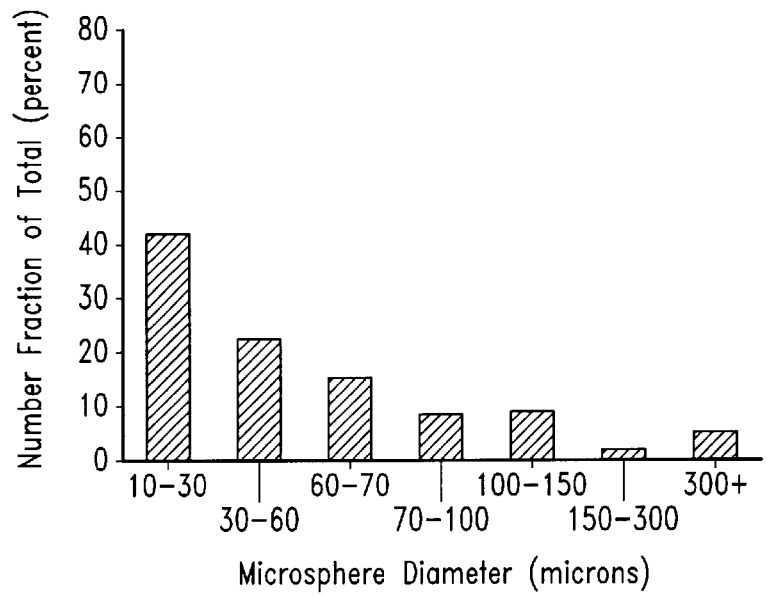
Figure 8B:
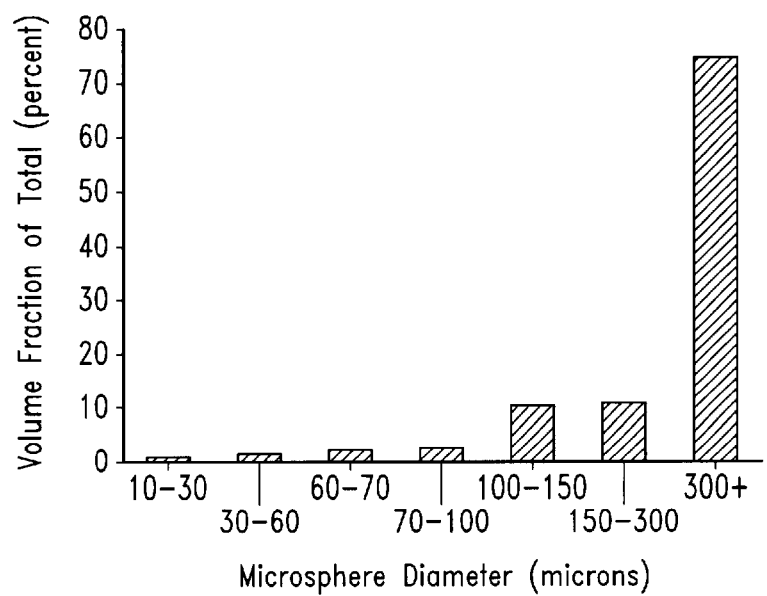

FIGS. 8A and 8B provide bar graphs of Number Fraction of Total (percent) vs. microsphere diameter (microns) and Volume Fraction of Total (percent) vs. microsphere diameter (microns), respectively, for a run conducted at 59° C., and with measurements performed on a sample size of 125.

Figure 9A:
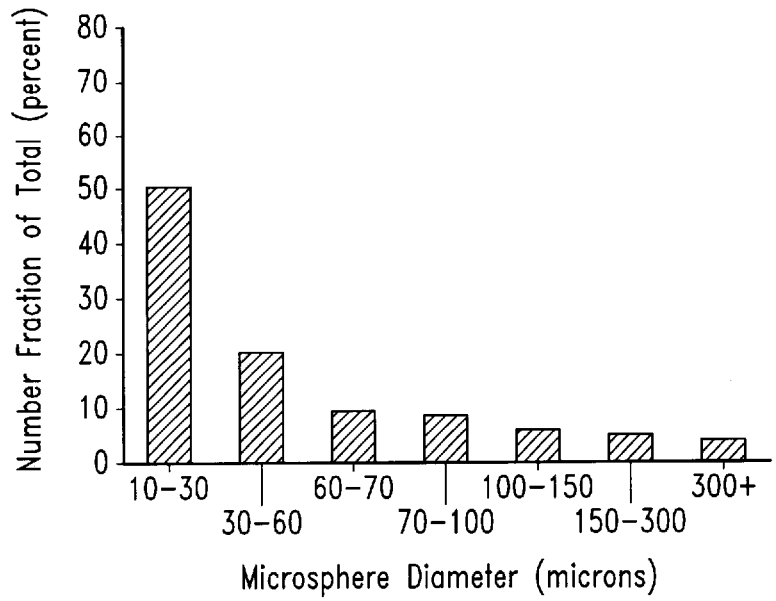
Figure 9B:
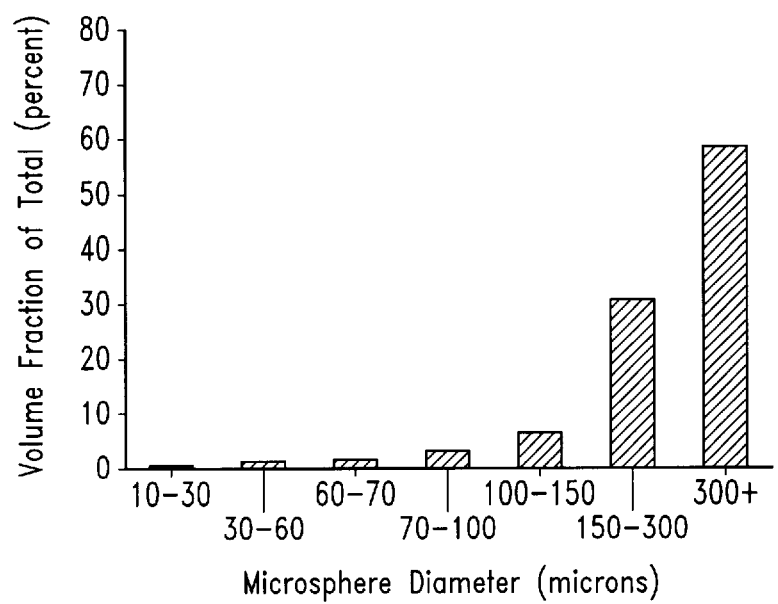

FIGS. 9A and 9B provide bar graphs of Number Fraction of Total (percent) vs. microsphere diameter (microns) and Volume Fraction of Total (percent) vs. microsphere diameter (microns), respectively, for a run conducted at 63° C., and with measurements performed on a sample size of 112.

Figure 10A:
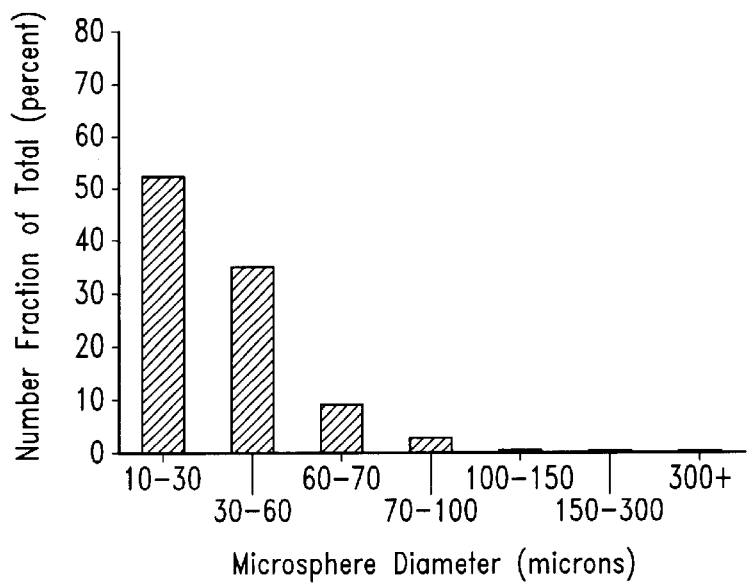
Figure 10B:
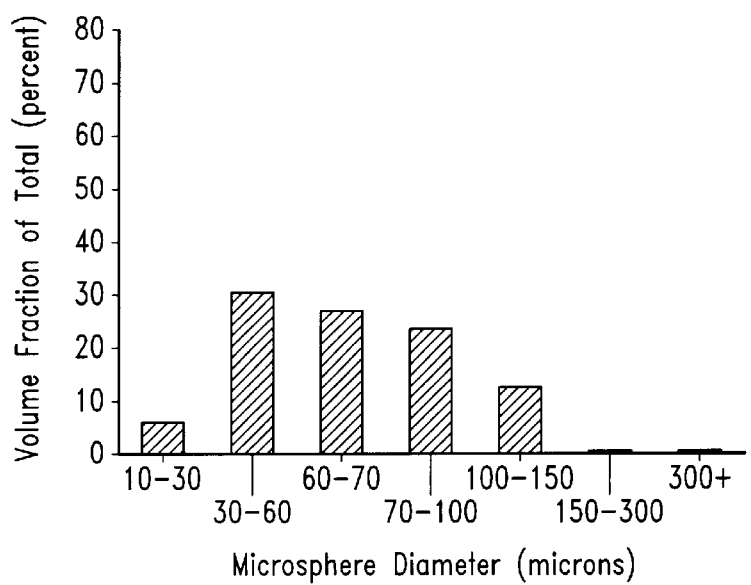

FIGS. 10A and 10B provide bar graphs of Number Fraction of Total (percent) vs. microsphere diameter (microns) and Volume Fraction of Total (percent) vs. microsphere diameter (microns), respectively, for a run conducted at 67° C., and with measurements performed on a sample size of 630.

Figure 11A:
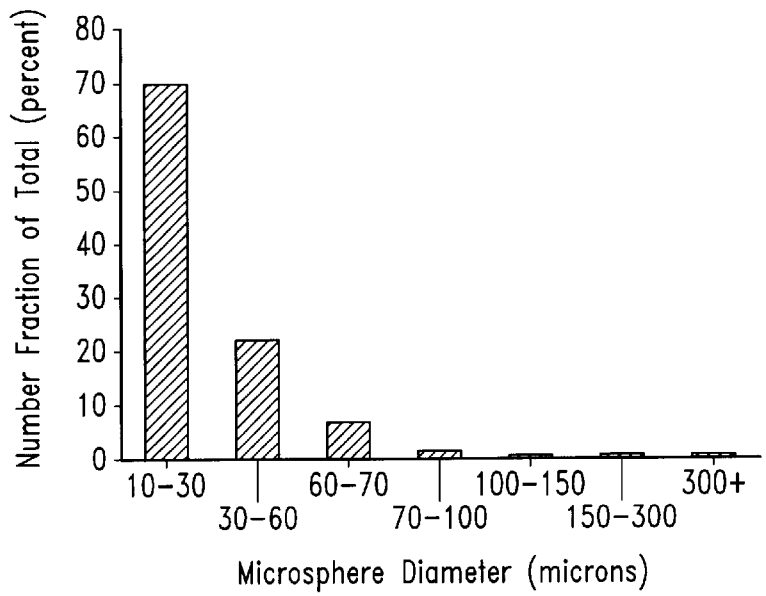
Figure 11B:
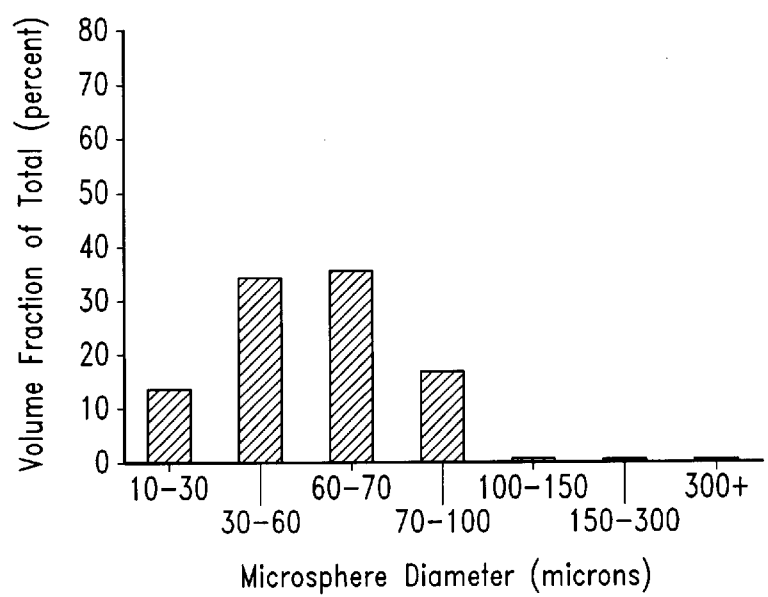

FIGS. 11A and 11B provide bar graphs of Number Fraction of Total (percent) vs. microsphere diameter (microns)

and Volume Fraction of Total (percent) vs. microsphere diameter (microns), respectively, for a run conducted at 72° C., and with measurements performed on a sample size of 176.

These data show that at lower temperatures, larger microspheres are formed. As the temperature is increased the average droplet size is decreased. Thus the size distribution shifts towards the smaller sizes. All temperatures studied follow this trend with the exception of lowest temperature. This suggests that at the higher end of the temperature range, the temperature's effect on the droplet size as a result of the rate of vaporization is more important than at the lower end. At the lower end of the temperature range other factors may dominate the mechanism of microsphere formation. Studying a temperature range produced a trend in the size distribution, whereas the other parameters, such as the stirring rate, when changed produced very drastic results, i.e., failure or success in producing microspheres.

Although the foregoing refers to particular preferred embodiments, it will be understood that the present invention is not so limited. It will occur to those of ordinary skill in the art that various modifications may be made to the disclosed embodiments and that such modifications are intended to be within the scope of the present invention, which is defined by the following claims.

What is claimed is:

1. A process wherein microspheres are formed, comprising,
    passing a first fluid composition comprising a polymer and a solvent through an orifice and directly into a second fluid composition comprising water and a microsphere-stabilizing agent, under at least one of conditions (a) and (b), wherein
    (a) the first composition flows through a first conduit along a first path and exits the first conduit at the orifice, the second composition flows through a second conduit along a second path in an upstream to downstream direction, the first conduit is connected to the second conduit and terminates at the orifice, the first and second paths being orientated at an angle θ relative to each other, wherein 0°<θ<180°;
    (b) the first composition being at a first temperature and comprising a solvent having a boiling point, the second composition being at a second temperature, the boiling point of the solvent being less than or near to the second temperature; and
    forming a composition comprising water and microspheres, the microspheres comprising the polymer.

2. The process of claim 1 wherein the first conduit extends into the second conduit to position the orifice within the second conduit, the orifice facing such that 45°<θ<90°, the orifice facing downstream when θ<90°.

3. A process according to claim 1 comprising injecting the first fluid composition through a needle and into the second fluid composition, the first composition comprising a polymer to be formed into a microsphere, the second composition flowing past a tip of the needle, and forming a composition comprising water and microspheres, the microspheres comprising the polymer.

4. A process according to claim 3 wherein the second composition flows along a path in an upstream to downstream direction, the needle and the path of the second composition being orientated at an angle θ relative to each other, wherein 45°<θ<90° such that at 90° the needle is perpendicular to the path of the second composition, and at 45° the tip of the needle opens in the downstream direction.

5. A process according to claim 3 wherein injecting the first composition into the second composition provides a population of emulsion droplets, the population having an average volume diameter, the average volume diameter having a standard deviation, the average volume diameter and/or standard deviation being influenced by a surface tension at the interface of the needle tip and the second composition, by a velocity of the second composition flowing past the needle tip, by a viscosity of the second composition, and/or by a diameter of the needle.

6. A process according to claim 1 comprising introducing the first fluid composition into the second fluid composition, the first composition being at a first temperature less than the boiling point of the solvent, the second composition being at a second temperature greater than the boiling point of the solvent, and forming a composition comprising water and microspheres, the microspheres comprising the polymer.

7. A process according to claim 6 wherein the solvent is an organic solvent, the second composition is located within a column having a top and a bottom, the second composition is stirred at a controlled stirring rate, and the first composition is introduced to the second composition through the bottom of the column at a controlled introduction rate.

8. A process according to claim 1 further comprising separating some or all of the solvent from some or all of the microspheres.

9. A process according to claim 1 wherein the polymer is a lipophilic polymer selected from the group consisting of polyester comprising repeating unites selected from the group consisting of lactide, caprolactone, glycolide and δ-valerolactone units, poly(ethylene-co-vinylacetate), poly (siloxane), poly(butyrolactone), and poly(urethane).

10. A process according to claim 1 wherein the polymer is a hydrophilic polymer selected from the group consisting of (a) a non-proteinaceous polymer selected from the group consisting of polymers prepared from ethylene oxide and/or propylene oxide, carboxylated poly(ethylene), poly (phosphazene), and polysaccharide, (b) a poly(amino acid), and (c) a blend of hydrophilic polymers.

11. A process according to claim 10 wherein the polymer is a polysaccharide selected from the group consisting of chitosan, N,O-carboxymethyl chitosan, O-carboxymethyl chitosan, N-carboxymethyl chitosan, alginate, methylcellulose, hydroxymethylcellulose, acacia, and tragacanth.

12. A process according to claim 10 wherein the hydrophilic polymer is serum albumin.

13. A process according to claim 10 wherein the hydrophilic polymer is a hydrophilic polymer blend, and the hydrophilic polymer blend comprises gelatin.

14. A process according to claim 1 wherein the polymer is poly(lactide-co-glycolide).

15. A process according to claim 14 wherein the poly (lactide-co-glycolide) concentration in the solvent is between 5 and 10 w/v %.

16. A process according to claim 1 wherein the microsphere-stabilizing agent is selected from the group consisting of poly(vinyl alcohol), gum arabic, carboxylated poly(ethylene), ethylated starches, carboxymethylcellulose, hydroxymethylcellulose, and mixtures thereof.

17. A process according to claim 1 wherein the stabilizing agent is poly(vinyl alcohol).

18. A process according to claim 17 wherein the poly (vinyl alcohol) concentration is between 1.0 and 2.0 w/v % in water.

19. A process according to claim 1 wherein the solvent is selected from the group consisting of dichloromethane, carbon tetrachloride, tetrahydrofuran, ethyl acetate, and polyethylene glycol.

20. A process according to claim 1 wherein the solvent is dichloromethane.

21. A process according to claim 1 wherein the solvent is dichloromethane, the microsphere-stabilizing agent is poly (vinyl alcohol), and the polymer is poly(ethylene-co-vinylacetate).

22. A process according to claim 1 wherein the microspheres have a volume average diameter of less than 300 microns.

23. A process according to claim 22 wherein the volume average diameter is between 50 and 150 microns.

24. A process according to claim 1 wherein the microspheres have a uniform size such that $1.0 \leq (\mu+s)$ $\mu \leq 1.3$ where $\mu$ is the volume average diameter of the microspheres, and s is the standard deviation in the volume average diameter of the microspheres.

25. A process according to claim 1 wherein prior to its contacting the first composition, the second composition does not contain microspheres.

26. A population of microspheres characterized in that $1.0 \leq (\mu+s)$ $\mu \leq 1.3$ and formed by a process comprising passing a first fluid composition comprising a polymer and a solvent through an orifice and directly into a second fluid composition comprising water and a microsphere-stabilizing agent, under at least one of conditions (a) and (b), wherein
(a) the first composition flows through a first conduit along a first path and exits the first conduit at the orifice, the second composition flows through a second conduit alone a second path in an upstream to downstream direction, the first conduit is connected to the second conduit and terminates at the orifice, the first and second paths being orientated at an angle $\theta$ relative to each other, wherein $0° \leq \theta \leq 180°$;
(b) the first composition being at a first temperature and comprising a solvent having a boiling point, the second composition being at a second temperature, the boiling point of the solvent being less than or near to the second temperature; and forming a composition comprising water and a population of microspheres, the microspheres comprising the polymer.

27. A population of microspheres characterized in having a volume average diameter of less than 300 microns and formed by a process comprising passing a first fluid composition comprising a polymer and a solvent through an orifice and directly into a second fluid composition comprising water and a microsphere-stabilizing agent, under at least one of conditions (a) and (b), wherein
(a) the first composition flows through a first conduit along a first path and exits the first conduit at the orifice the second composition flows through a second conduit along a second path in an upstream to downstream direction, the first conduit is connected to the second conduit and terminates at the orifice, the first and second paths being orientated at an angle $\theta$ relative to each other, wherein $0° < \theta < 180°$;
(b) the first composition being at a first temperature and comprising a solvent having a boiling point, the second composition being at a second temperature, the boiling point of the solvent being less than or near to the second temperature; and forming a composition comprising water and a population of microspheres, the microspheres comprising the polymer.

* * * * *

UNITED STATES PATENT AND TRADEMARK OFFICE
CERTIFICATE OF CORRECTION

PATENT NO.   : 6,224,794 B1
DATED        : May 1, 2001
INVENTOR(S)  : Brian G. Amsden and Richard T. Liggins It is certified that error appears in the above-identified patent and that said Letters Patent is hereby corrected as shown below:

<u>Column 24, claim 27,</u>
Line 20, "orifice the second composition" should read -- orifice, the second composition --.

Signed and Sealed this

Eighth Day of January, 2002

Attest:

Attesting Officer

JAMES E. ROGAN
Director of the United States Patent and Trademark Office